United States Patent [19]
Guinther et al.

[11] Patent Number: 6,016,466
[45] Date of Patent: Jan. 18, 2000

[54] ACCURATE PROFILE AND TIMING INFORMATION FOR MULTITASKING SYSTEMS

[75] Inventors: Thomas Guinther, Nashua; James Austin, Merrimack, both of N.H.

[73] Assignee: Compuware Corporation, Farmington Hills, Mich.

[21] Appl. No.: 09/079,125

[22] Filed: May 14, 1998

Related U.S. Application Data

[63] Continuation-in-part of application No. 09/066,988, Apr. 23, 1998, and a continuation-in-part of application No. 08/916, 125, Aug. 21, 1997, Pat. No. 5,987,249
[60] Provisional application No. 60/046,411, May 14, 1997, provisional application No. 60/045,018, Apr. 28, 1997, provisional application No. 60/024,624, Aug. 27, 1996, and provisional application No. 60/036,250, Jan. 24, 1997.

[51] Int. Cl.[7] .............................. G06F 7/00; G06F 11/32
[52] U.S. Cl. .......................... 702/187; 702/186; 714/39
[58] Field of Search .................................. 702/187, 186; 395/704, 677; 714/39

[56] References Cited

U.S. PATENT DOCUMENTS

| | | |
|---|---|---|
| 4,713,791 | 12/1987 | Saluski .................................. 364/900 |
| 4,937,780 | 6/1990 | Geyer et al. . |
| 5,371,689 | 12/1994 | Tatsuma . |
| 5,590,342 | 12/1996 | Marisetty . |
| 5,732,272 | 3/1998 | Gochee ..................................... 395/704 |
| 5,758,184 | 5/1998 | Lucovsky et al. ....................... 395/826 |
| 5,828,881 | 10/1998 | Wang ....................................... 395/680 |
| 5,872,909 | 2/1999 | Wilner et al. ....................... 395/183.14 |

OTHER PUBLICATIONS

"Method to Allow a Virtual Machine Guest Operating System to Calculate Accurate Elapsed Times for Accounting Purposes", IBM Technical Disclosure Bulletin, vol. 34, No. 2, Jul. 1, 1991, pp. 220–221.

*Primary Examiner*—Patrick Assouad
*Attorney, Agent, or Firm*—Foley, Hoag & Eliot, LLP

[57] ABSTRACT

Determining execution time for a portion of software includes obtaining a first time stamp value at a beginning of the portion and obtaining a second time stamp value at an end of the portion. At least one of the first and second time stamp values is adjusted to compensate for any amount of time that the portion is swapped out in a multitasking operating system. The first time stamp value is subtracted from the second time stamp value to determine execution time. Determining execution time may also include providing a deltaout value that is initialized to zero prior to the portion being run for a first time. The deltaout value is incremented by an amount of time the portion is swapped out. The first time stamp value is compensated by subtracting the deltaout value therefrom and the second time stamp value is compensated by subtracting the deltaout value therefrom.

24 Claims, 15 Drawing Sheets

ACCURATE PROFILE AND TIMING INFORMATION FOR MULTITASKING SYSTEMS

CROSS-REFERENCE TO RELATED APPLICATIONS

This application is based on U.S. provisional patent application No. 60/046,411 filed on May 14, 1997 and is a continuation-in-part of U.S. patent application Ser. No. 09/066,988 filed Apr. 23, 1998, which is based on U.S. Provisional Patent Application No. 60/045,018 filed on Apr. 28, 1997 and is a continuation-in-part of U.S. patent application Ser. No. 08/916,125, filed on Aug. 21, 1997 U.S. Pat. No. 5,987,249, which is based on U.S. Provisional Patent Applications Nos. 60/024,624 and 60/036,250 filed on Aug. 27, 1996 and Jan. 24, 1997, respectively.

BACKGROUND OF THE INVENTION

1. Field of the Invention

This application relates to the field of software and more particularly to the field of providing accurate profile and timing information for software that is executed in connection with an operating system that automatically shares processor resources with multiple portions of software.

2. Description of Related Art

A profiler is a software development tool used to determine execution time for a program or for a particular portion(s) of a program. The profiler may be used for optimizing code by providing a developer with execution time information for various blocks thereof. The developer uses this information to modify portions of code that can then be rerun using the profiler to confirm that the modifications have shortened the execution time.

A common technique for profiling a block of code is to record a first timestamp immediately prior to execution of the block of code and to record a second timestamp immediately following execution of the block of code. The difference between the first and second timestamps is the amount of time used for executing the block of code. In some instances, the timestamps can be provided by accessing a system clock of the computer system.

In multitasking operating systems, multiple blocks of code share processor time. Swapping of tasks is performed by an operating system that causes the various blocks of code to have access to the processor, one at a time. This swapping is often performed in a way that is transparent to the blocks of code. That is, each of the blocks of code is swapped in and swapped out in a manner that is not detected by the block of code. In addition, in many instances, the swapping may be performed during execution of any portion of the block of code.

A multitasking operating system provides challenges to profiling a block of code. Specifically, using the timestamp technique described above would create inaccuracy since the difference between the first and second timestamp values would not necessarily be the time spent executing of the block of code. In some instances, the block of code may have been swapped out by the operating system after the first timestamp value is recorded but before the second timestamp value is recorded. Thus, the difference between the timestamp values would be the sum of the execution time of the block of code plus an indeterminate amount of time that the block of code spent being swapped out while other, unrelated, blocks of code had access to the processor.

One solution to this difficulty is to calculate profiling information based on an expected execution time of the block of code. The expected execution time may be determined using the individual execution times of each of the instructions that make up the block of code. However, there are a number of difficulties with this technique. In the first place, the same code may run on different processors of the same family that have different execution times for the same instructions. Similarly, the same processor may run under different clock speeds. Thus, a particular instruction for a processor family may not have one particular value for execution time. In addition, some processors employ instruction caching in which groups of instructions are executed more quickly than the sum of execution times of each of the individual instructions. Caching is accomplished via a variety of conventional techniques, such as pipelining and using internal memory having a shorter access time than the external RAM.

It would be advantageous to provide a reliable technique for profiling blocks of code that run in a multitasking system.

SUMMARY OF THE INVENTION

According to the present invention, determining execution time for a portion of software includes obtaining a first time stamp value at a beginning of the portion, obtaining a second time stamp value at an end of the portion, adjusting at least one of the first and second time stamp values to compensate for any amount of time that the portion was swapped out in a multitasking operating system, and subtracting the first time stamp value from the second time stamp value to determine execution time. Determining execution time may also include providing a deltaout value that is initialized to zero prior to the portion being run for a first time, incrementing the deltaout value by an amount of time the portion is swapped out, compensating the first time stamp value by subtracting the deltaout value therefrom, and compensating the second time stamp value by subtracting the deltaout value therefrom.

Determining execution time may also include, prior to the portion being run for the first time, causing calls to a context swapping operating system routine to also execute a hook routine that determines when the portion is becoming a running portion and when the portion is becoming a non-running portion. A pointer to the hook routine may be provided as a parameter to an operating system routine that causes calls to the context swapping routine to also call the hook routine. Alternatively, a pointer to the hook routine may be written to a location for a pointer for a function that is called by the context swapping routine. Alternatively still, the context swapping routine may be patched to cause a jump to the hook routine.

A driver having an entry point that is called each time the portion is swapped in and each time the portion is swapped out may be provided. The driver may be a kernel mode driver in a Windows NT operating system environment or a virtual driver in a Windows 95 operating system environment. The portion may be part of a thread and the driver may be called each time a thread is created and each time a thread is terminated. Determining execution time may also include creating data that is accessable by the driver and by the application. The data may indicate an amount of time that each thread being monitored is swapped out.

The system according to the present invention allows monitoring execution time for functions, lines of source code, calls to uninstrumented portions of code, and generally any portion of code used in a multitasking operating system. Compensating for time swapped out allows for a more accurate measurement of profile timing for a portion of code in a multitasking operating system. In addition, using the system clock provides flexibility with respect to running the same portion of code on different processors of the same family or the same processor at different clock speeds.

DETAILED DESCRIPTION OF THE PREFERRED EMBODIMENT(S)

Figure 1:
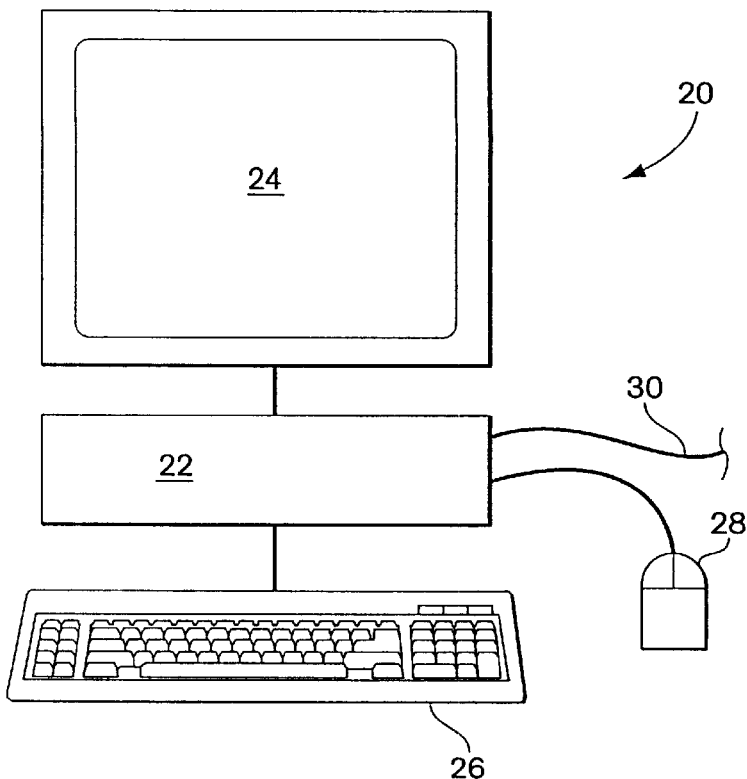
FIG. 1 shows a computer system that may be used to implement IR code instrumentation according to the present invention.

Referring to FIG. 1, a computer system 20 includes a processor 22, a display unit 24, a keyboard 26 and (optionally) a mouse input device 28. The user provides input to the processor 22 via the keyboard 26 and the mouse 28 and views output from the processor 22 via the display unit 24. The computer system may be a model P5-166 manufactured by Gateway Computer of Sioux City, S.D.

The computer system 20 may include a connection 30 to a conventional computer network (not shown), such as the Microsoft NT network. The computer system 20 may receive data and/or other network services, in a conventional manner, through the connection 30 to the network. The processor 22 may include conventional local storage or may use conventional storage available on the network wherein the processor 22 sends and receives data to and from the network via the network connection 30. The computer system 20 may use a combination of local storage and network storage in a conventional manner. In the discussion that follows, no specific reference is made to the type of storage device (i.e., local, network, or a combination thereof) since the system described herein does not depend on the type of computer data storage used.

Figure 2:
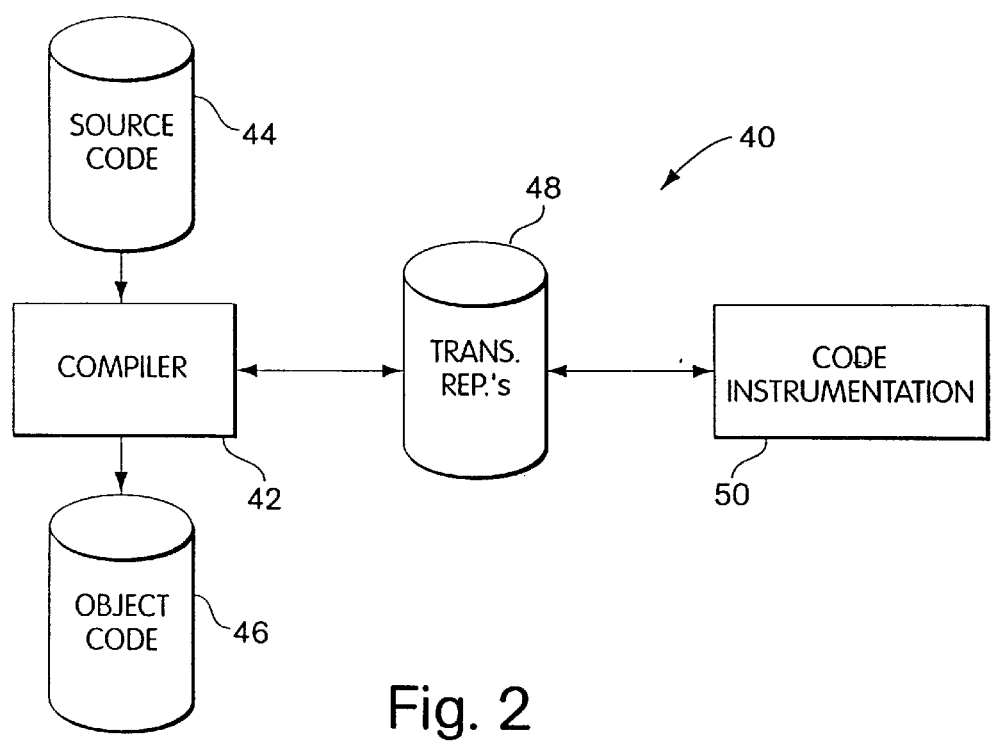
FIG. 2 is a data flow diagram illustrating a compiler operating in conjunction with IR code instrumentation according to the present invention.

Referring to FIG. 2, a data flow diagram 40, illustrates relationships between various executable code and data segments stored using the storage device of the processor 22. A software compiler 42 includes executable code that converts data representing computer source code 44 into data representing computer object code 46. The compiler 42 may be any one of a variety of conventional, commercially available, software compilers, such as the Microsoft C++compiler manufactured by Microsoft Corporation of Redmond, Wash. If the compiler 42 is a C++compiler, then the source code 42 represents C++source code information entered by a user in a conventional manner such as, for example, entering the C++source code statements into a text file in the computer system 20 using the keyboard 26 and mouse 28. The source code 44 may also be generated by any one of a variety of alternative techniques, such as other conventional, commercially available software that automatically generates the source code 44.

The object code 46 includes low-level code that is executable on a target processor (not shown). Accordingly, the object code 46 is target-specific. Note that the target processor may be the same type of processor as the processor 22 used in the computer system 20 or, alternatively, the target processor may be a different processor. The object code 46 is provided by the compiler 42 in a conventional manner.

In the course of compiling the source code 44 into object code 46, the compiler 42 may generate a plurality of transitional representations 48 that correspond to intermediate stages of the compile process. The transitional representations 48 may include a plurality of (usually temporary) data files that are created and accessed by the compiler 42. Each stage of the compiler 42 may access and/or create a particular one of the transitional representations that is provided by the previous stage of the compiler 42. Features of some of the transitional representations 48 are described in more detail hereinafter.

Code instrumentation software 50, that executes on the processor 22, accesses the transitional representations 48 and adds instrumentation instructions that ultimately provide instrumentation functionality to the object code 46. When the object code 46 is executed, the thus-added instrumentation functionality facilitates debugging in a manner described in more detail hereinafter.

Figure 3:
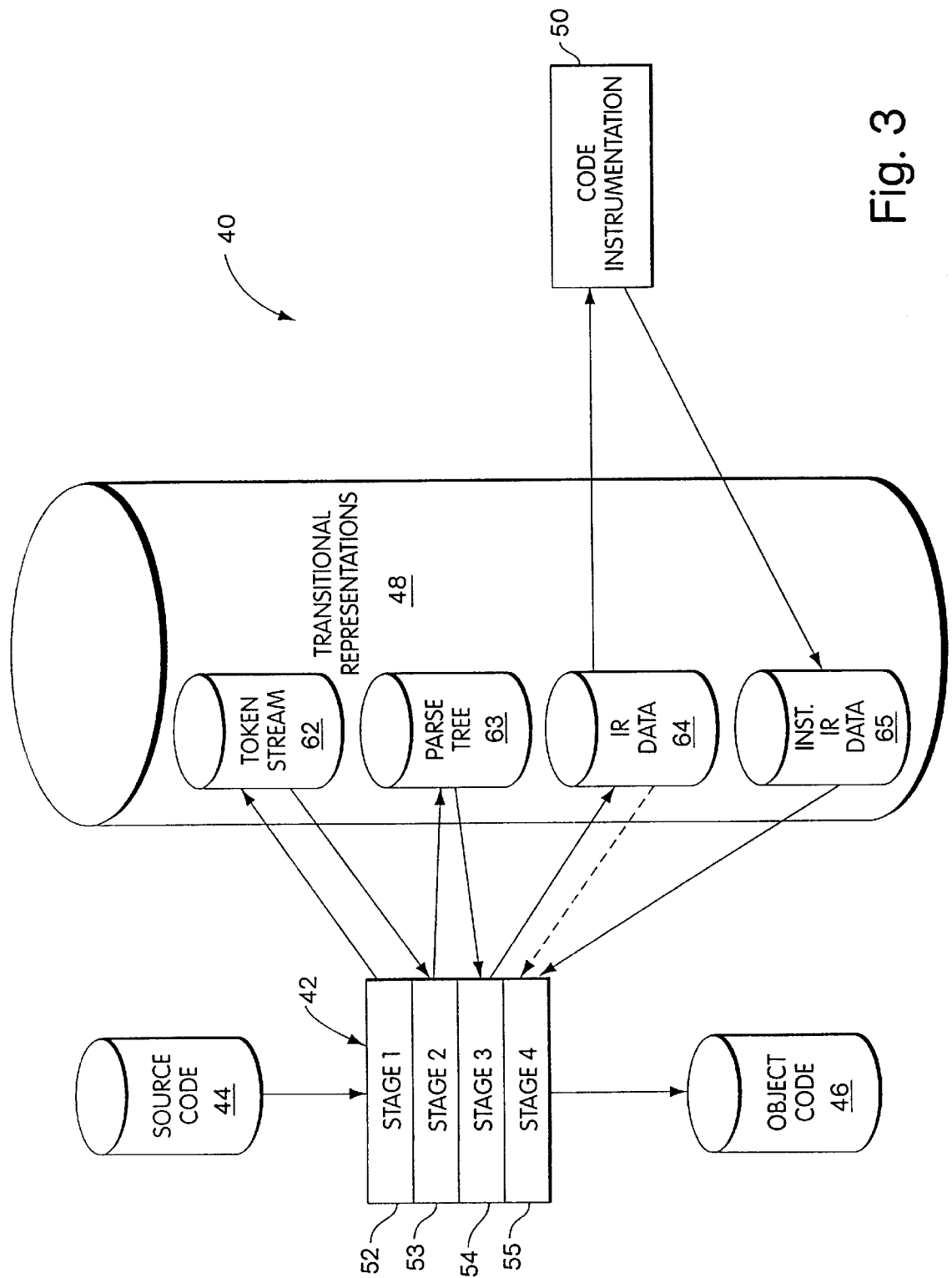
FIG. 3 is a data flow diagram illustrating interaction between various stages of the compiler and the IR code instrumentation according to the present invention.

Referring to FIG. 3, the data flow diagram 40 of FIG. 2 is illustrated with additional details included for the compiler 42 and for the transitional representation 48. The compiler 42 is shown herein as having four stages 52–55 that each perform a different phase in the process of transforming the source code 44 into the object code 46. The transitional representations 48 are shown as including various data elements that are created and/or accessed by the compiler 42. Note that other compilers may have more or less stages and that portions of the transitional representations 48 may be stored in a file, a computer memory, a combination thereof, or a variety of other means for maintaining computer data.

For the embodiment illustrated herein, the first stage 52 of the compiler 42 accesses the source code 44 and, in a conventional manner, converts the source code into tokens stored in a token stream data element 62. The token stream data element 62 contains symbols that represent individual source code statements. The symbols may be ordered according to the order of source code statements in the source code 44. The token stream 62 is provided to the second stage 53 of the compiler 42, which, in a conventional manner, converts the tokens from the token stream data element 62 into data stored in a parse tree data element 63. The parse tree data element 63 is a tree-like data structure that is constructed in a conventional manner using nodes corresponding to tokens from the token stream data element 62 that are interconnected in a directed graph according to entry and exit points of portions of the source code.

The parse tree data element 63 is provided to the third stage 54 of the compiler 42 which uses the data from the parse tree data element 63 to produce Intermediate Representation (IR) data that is stored in an IR data element 64. As described in more detail hereinafter, the IR data element 64 contains an intermediate representation of the program that is independent of the particular language used for the source code 44 and is also independent of the target processor on which the object code 46 will execute.

The fourth stage 55 of the compiler 42 converts IR data from the IR data element 64 into the object code 46. Without the code instrumentation unit 50, the fourth stage 55 of the compiler 42 could access the IR data element 64 (as indicated by the dashed line connecting the IR data element 64 to the fourth stage 55) and convert IR data from the IR data element 64 into the object code 46. However, in the system described herein, the IR data element 64 is provided to the code instrumentation 50 which, in a manner described in more detail below, instruments the IR data element 64 to provide an instrumented IR data element 65. In the system described herein, the fourth stage 55 of the compiler 42 accesses the instrumented IR data element 65 to provide the object code 46. Note that since the IR data element 64 and the instrumented IR data element 65 have the same basic structure, it is virtually transparent to the fourth stage 55 of the compiler 42 that the instrumented IR data element 65, instead of the IR data element 64, is being accessed to create the object code 46.

The IR data element 64 and the instrumented IR data element 65 contain conventional IR data that is both source and destination independent. The IR data represents the logical flow and operation of the program independent of the particular source code that is used in the source program to describe the logical flow and operation. In addition, the IR data is independent of the specific form of the object code (i.e., the specific target processor). Such IR data is well known in the prior art and will not be described in detail herein except as necessary to describe the invention.

Figure 4:
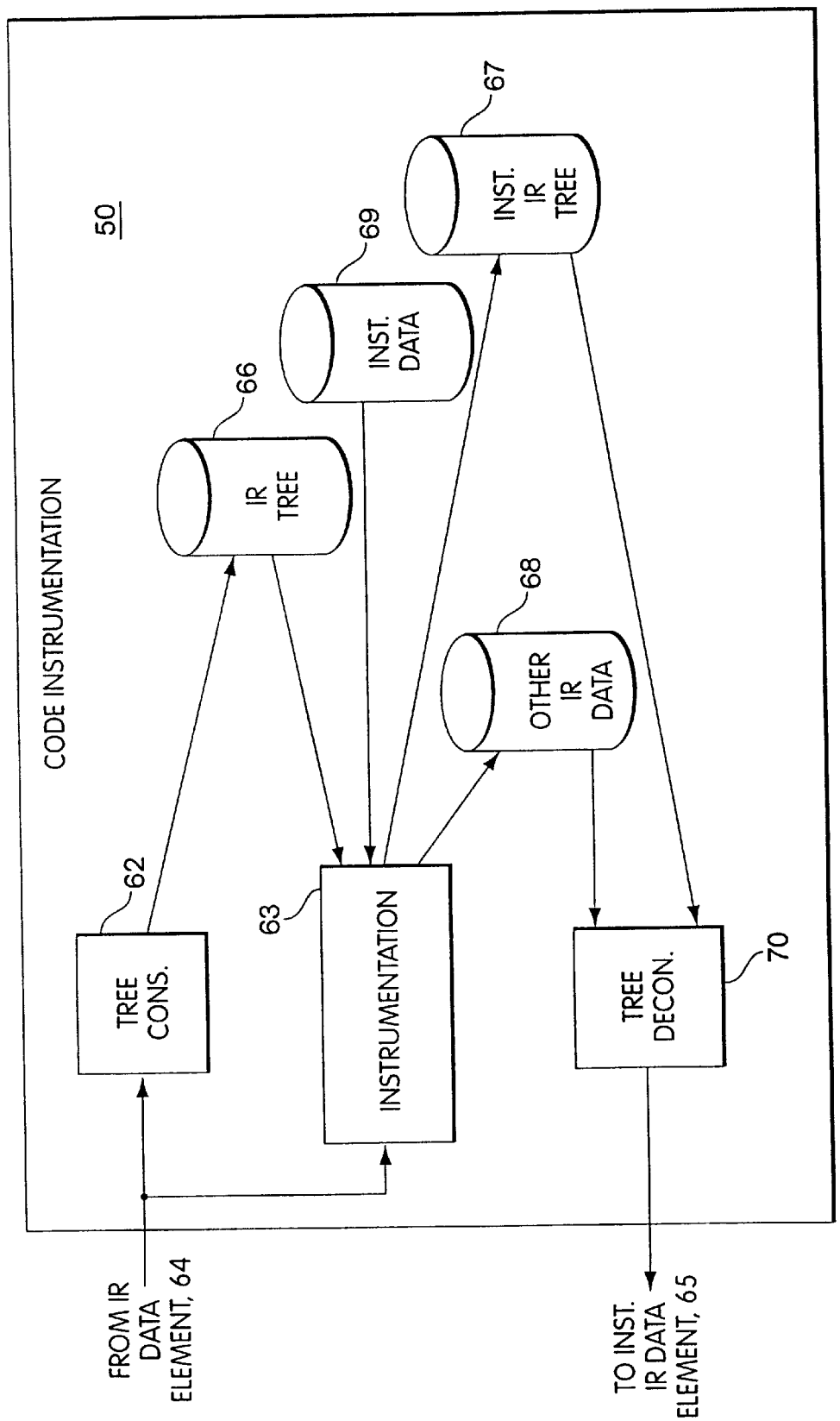
FIG. 4 is a data flow diagram illustrating in detail operation of the software for IR instrumentation.

Referring to FIG. 4, the code instrumentation 50 includes tree construction software 62 for constructing an IR tree, instrumentation software 63 for instrumenting both the IR tree and other IR data, and tree deconstruction software 70 for converting the thus-instrumented IR tree and other IR data into the instrumented IR data element 65. The tree construction software 62 receives input from the IR data element 64 and, in a manner described in more detail below, constructs an IR tree to provide to an IR tree data element 66. The instrumentation software 63 uses the IR tree data element 66 and other IR data from the IR data element 64 to provide an instrumented IR tree 67 and other IR data 68.

The instrumentation software 63 may also be provided with instrumentation data from an instrumentation data element 69. The instrumentation data element 69 may contain run time instrumentation routines and other IR data that is inserted by the instrumentation software 63 into the instrumented IR tree data element 67, the other IR data 68, or a combination thereof. The instrumentation software 63 and the instrumentation data element 69 are described in more detail hereinafter. The tree deconstruction software 70 uses the instrumented IR tree data element 67 and the other IR data 68 to create the instrumented IR data element 65. The tree deconstruction software 70 is described in more detail hereinafter.

The IR data consists of a plurality of operations and operands that correspond to the logic of the underlying source computer program. Note that the terms "operation" and "operand" may be defined broadly in this instance to include any type of statements found within IR data, including program transition statements such as call and goto, and static information such as line numbers. An operand can be a simple operand (e.g., a single variable or constant) or can be a complex operand (e.g., an expression) that corresponds to additional suboperations and operands. For example, IR data may indicate that the left side of an expression is to be set equal to the right side of an expression. The left side of the equation could be a single variable (i.e., a simple operand). The right side of the equation could also be simple operand (e.g., a constant) or could be a complex operand (e.g., an expression) that must be further evaluated in the context of additional operators and operands (e.g., addition of two variables).

Note that the IR data is both source language independent and target machine independent so that, for example, a source code statement written in a first source language could generate IR data that is identical to a programatically equivalent source language statement in a second source language if the underlying operations are identical. Similarly, a particular set of IR data can be converted by a compiler into many different object codes depending on the target machine. Although a specific IR representation may be particular to a specific compiler manufacturer, IR data and IR representations are generally known in the art. See, for example, a section titled "Graphical Representations" at pages 464–465 of Aho, Seth & Ullman, *Compilers, Principles, Techniques, and Tools*, published by Addison-Wesley of Reading Mass., 1986.

Figure 5:
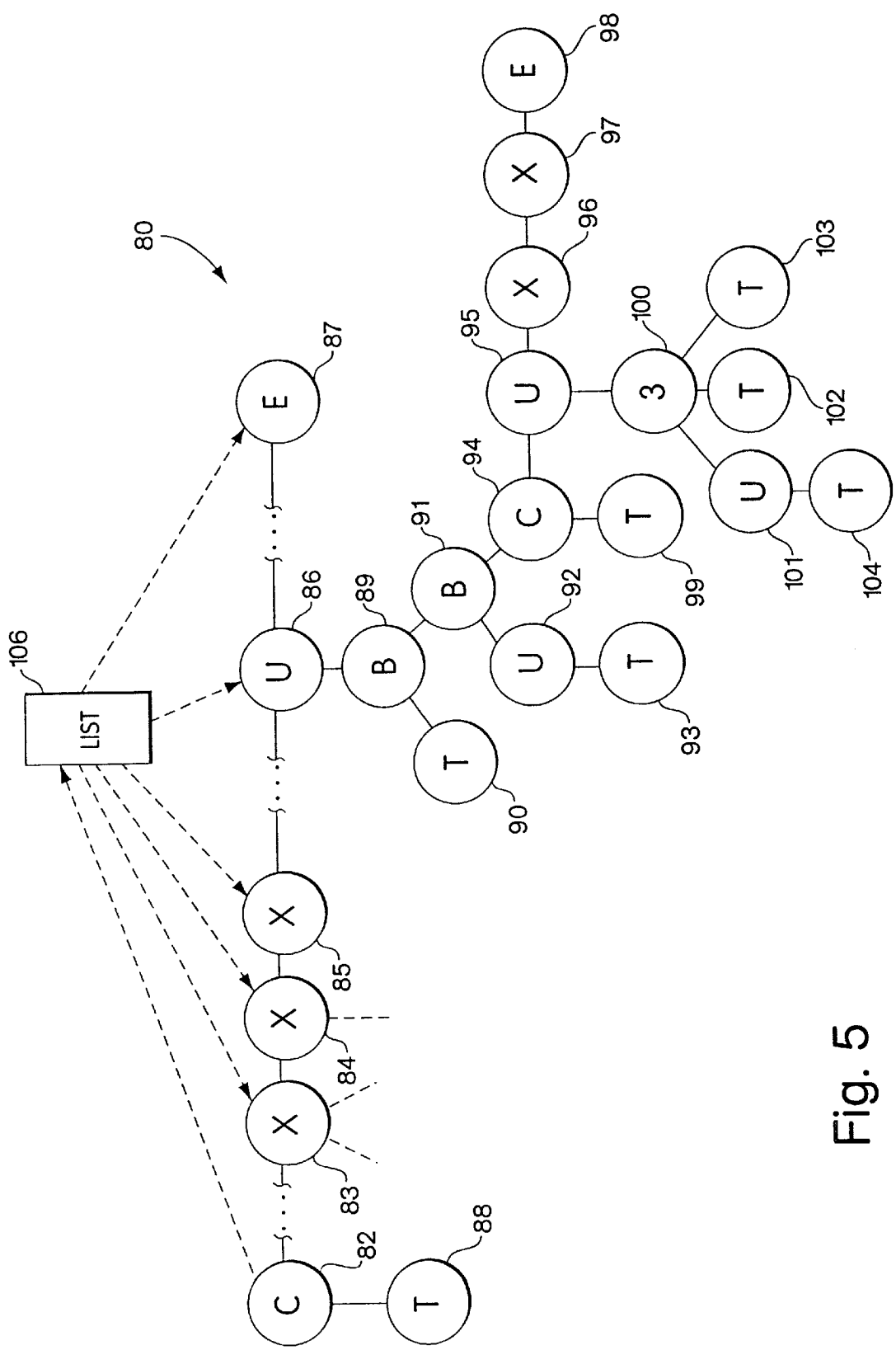
FIG. 5 illustrates a tree data structure corresponding IR code operators and operands.

Referring to FIG. 5, a tree 80 corresponds to the IR tree data element 66 provided by the tree construction software 62 shown in FIG. 4 and discussed above. The tree 80 includes a plurality of nodes 82–104. The nodes 82–104 have different types and are labeled according to type as follows:

T: terminal node

U: unary node

B: binary node

3: ternary node

C: combination node

E: end of list indicator node

X: indeterminate node, one of the above listed types of nodes

The terminal nodes 88, 90, 93, 99, 102–104 are nodes of the tree 80 having no children. The unary nodes 86, 92, 95 have only one child. The binary nodes 89, 91 have two children. The ternary node 100 has three children. The combination nodes 82, 94 have two children wherein one of the children is a list terminated by the end of list nodes 87, 98. The indeterminate nodes 83–85, 96, 97 represent nodes that could be any one of the other types of nodes and have been included in the tree 80 to facilitate illustration of the structure of the tree 80.

Each of the nodes 82–104 represents an IR operation and/or an IR operand within the IR data. For any particular one of the nodes 82–104, the children thereof represent the operators and the operands used to evaluate the parent. For example, the binary node 89 could represent an operation having two operands corresponding to the two children of the binary node 89: the terminal node 90 and the binary node 91. The terminal node 90 does not have any children and thus may correspond to a simple operand (e.g., a constant). The binary node 91 is a complex operand having children (the unary node 92 and the combination node 94) which are evaluated in order to evaluate the complex operand represented by the binary node 91.

For the combination nodes 82, 94, the attached list elements are shown as being linked together so that, for example, the node 83 is shown being linked to the node 84 and the node 84 is shown as being linked to the node 85. Another possible way to construct the list is to have the combination node 82 point to a separate list data structure 106 that contains pointers to the remaining nodes 83–87 that represent elements of the list. In that case, there would be no need for the connections between members of the list so that the node 83 would not contain a pointer to the node 84, nor would the node 84 contain pointers to the nodes 83, 85, nor would the node 85 contain a pointer to the node 84. The advantage of such a construction is that none of the nodes 83–87 would use extra storage space for pointers to the peers thereof Of course, separately constructing the list 106 may add complexity and possibly additional processor time in connection with manipulating the combination node 82. Note that irrespective of whether the list nodes 83–87 are connected peer to peer or are simply pointed to by the separate list 106, the end of list may conveniently be indicated by the end of list node 87.

The tree 80 illustrates that the underlying program corresponding to the IR data can be represented as a list of root nodes of a plurality of subtrees. That is, the program may be represented by a list of nodes 82–87 that correspond to root nodes of a plurality of subtrees. Of course, some of these subtrees may simply have a root node without substructure while other subtrees, such as the subtree emanating from the node 86, may have a more involved structure. Note also that, in some embodiments, the tree 80 may represent a single function among a plurality of functions contained in the IR data element 64.

Figure 6:
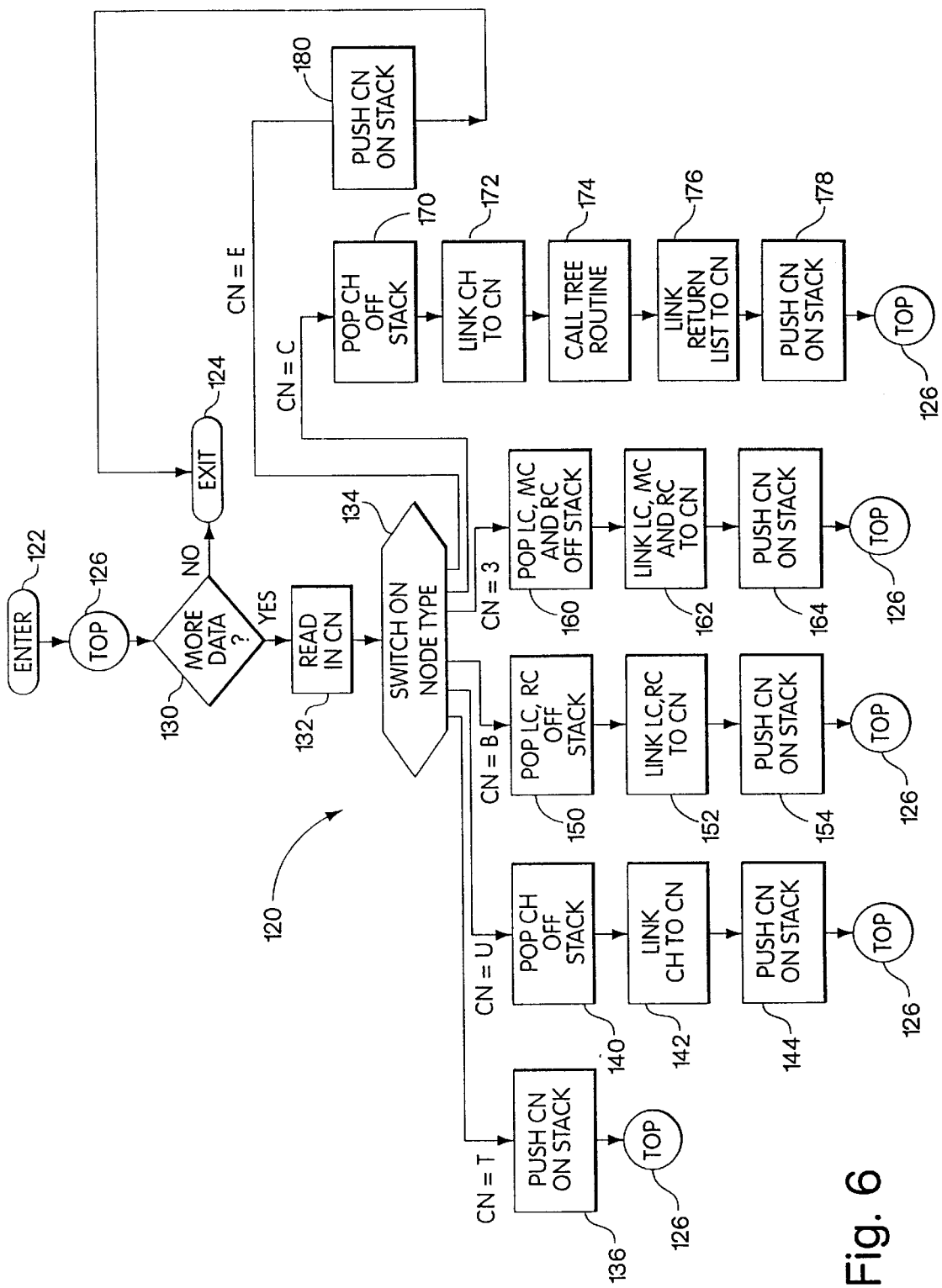
FIG. 6 is a flow chart illustrating steps used to construct the tree data structure of FIG. 5.

Referring to FIG. 6, a flowchart 120 illustrates operation of the tree construction software 62 of FIG. 4 that uses data from the IR data element 64 to provide the IR tree data element 66. The flowchart includes an entry point 122 and an exit point 124. A connector 126 labeled "TOP" is used to simplify the flowchart 120 by decreasing the number of flow lines thereon. All points on the flowchart labeled with the connector 126 represent the same logical point in the flow of the code.

The data that is read from the IR data element 64 and processed by the tree construction software 62 could be stored in a computer file. In other embodiments, data may be stored in computer memory or stored using any one of a variety of means sufficient for providing the IR data element 64. Each node may be represented by a variable length record having conventional type and size indicators. In the embodiment illustrated herein, it is assumed that the data is stored in a conventional computer file with a the operands corresponding to a node being at an earlier point in the file than the node itself. For example, if a particular node representing the addition operation has two children representing the first and second operands that are being added, then the three nodes (parent and two children) may be stored in the file with the first and second operands being located sequentially prior to the node indicating the addition operation. Accordingly, for any tree or subtree, the root node may be located in the file following all of the children nodes. In a preferred embodiment, the data from the IR data element 64 is first read into a flat list (such as a linked list or an array). Then the flat list is processed to provide the tree 80. The nodes that are part of the flat list may be the same nodes stored in the tree 80 (i.e., the same data), with the tree 80 being constructed by simply adding links to the nodes in the flat list to form the tree 80. Alternatively, the flat list may be part of the IR data element 64.

Processing for the routine illustrated in FIG. 6 begins at a test step 130 which determines if there is more data to be processed. If not, then processing is complete and control passes to the exit point 124 to exit the tree construction software. Otherwise, control passes to a step 132 where the current node (CN) is read in. The CN represents the node that is processed by the remainder of the software. Note that if a separate flat list of nodes is used, then "reading in" CN may simply refer to examining the next node in the list. Otherwise, the CN may be read directly from the IR data element 64.

Following the step 132 is a step 134 where the node type of the CN is determined. Note that there are many conventional techniques known in the art for associating a type with a portion of data such as, for example, using a unique numeric code to differentiate between types. Once the node type is determined at the step 134, control passes to one of a plurality of code branches that process the particular node type.

If it is determined at the step 134 that the CN is a terminal node, then control passes from the step 134 to a step 136 where the CN is pushed onto a stack. As discussed in more detail below, the tree construction software 62 uses a local stack to construct the tree 80. Following with step 136, control passes back to the beginning of the routine (as indicated by the connector 126) to the steps 130, 132 (discussed above) that check to see if there is more data to be processed and, if so, then read that data into the CN.

If it is determined at the step 134 that the CN is a unary node (i.e., a node with one child), then control passes from the step 134 to a step 140 where the child (CH) of the unary node is popped off the local stack. Note that the child of the unary node would have been read in previously, per the convention adopted for storing the IR data, discussed above. Following the step 140 is a step 142 where the child of the unary node (i.e., the child of the CN) is linked to the CN. Following the step 142 is a step 144 where the CN is pushed onto the local stack. Note that the CN may be a child of another node that will be subsequently read in. Following the step 144, control passes back to the beginning of the routine, as indicated by the connector 126.

If it is determined at the step 134 that the CN is a binary node (i.e., a node having two children), then control passes from the step 134 to a step 150 where the left child (LC) and the right child (RC) of the CN are popped off the local stack. Following the step 150 is a step 152 where the left child and right child are linked to the CN. Following the step 152 is a step 154 where the CN is pushed onto the local stack. Following step 154, control transfers back to the beginning of the routine, as indicated by the connector 126.

If it is determined at the step 134 that the CN is a ternary node, then control transfers from the step 134 to a step 160 where the three children of the ternary node, the left child (LC), middle child (MC), and right child (RC), are popped off the local stack. Following the step 160 is a step 162 where the left child, middle child, and right child are linked to the CN. Following the step 162 is a step 164 where the CN is pushed onto the local stack. Following the step 164, control transfers back to the beginning of the routine, as indicated by the connector 126.

If it is determined at the step 134 that the CN is a combination node, then control transfers from the step 134 to a step 170 where the child node (CH) is popped off the local stack. As discussed above in connection with FIG. 5, a combination node has two children where the first child is a single node and the second child is a list of nodes. In terms of storage of the IR data associated with a combination node, the first child may be stored prior to the combination node but the second child (the list elements) may be stored immediately after the combination node. Note also that, as discussed above, the end of the list is indicated by an end of list node.

Following the step 170 is a step 172 where the child node is linked to the CN. Following the step 172 is a step 174 where the routine is recursively called to process the elements of the list to be attached to the CN. As discussed in detail below, the return from the recursive call to the routine occurs when the end of list indicator is reached. Also, by convention, the routine may return a list containing items remaining on the local stack used by the routine.

Following the step 174 is a step 176 where the list returned by the call to the routine at the step 174 is linked to the CN to become the attached list of the combination node. Note that the call to the routine at step 174 causes each of the elements of the list for the combination node to be processed and placed on the local stack. Accordingly, the list of local stack elements may be returned upon returning from the call to the routine at the step 174. Following the step 176 is a step 178 where the CN (i.e., the combination node) is pushed onto the stack. Following step 178, control passes back to the beginning of the routine, as indicated by the connector 126.

If it is determined at the step 134 that the CN is an end of list indicator node, then control passes from the step 134 to a step 180 where the CN is pushed onto the local stack. Following the step 180, control passes back to the step 124 to return from the routine. Note that, in many instances, the return from the routine at this point is a return from a previous recursive call to the routine that was made when the corresponding combination node (the parent for the current list) was first encountered, as described above in connection with the steps 174, 176.

As discussed above, the instrumentation software 63 shown in FIG. 4 operates on the IR tree data element 66 to provide the instrumented IR tree data element 67. The instrumentation software 63 also uses data from the other instrumentation data element 69 which, as discussed in detail below, includes a plurality of run time instrumentation routines that may be added to the IR tree to facilitate run time debugging. In addition, as discussed in more detail below, the instrumentation software 63 instruments other IR data to provide the other IR data element 68 that includes instrumented versions of IR data. Once the instrumentation software 63 has provided the instrumented IR tree data element 67, the tree deconstruction routine 70 uses the instrumented IR tree data element 67 and the other IR data element 68 to provide the instrumented IR data element 65.

Figure 7:
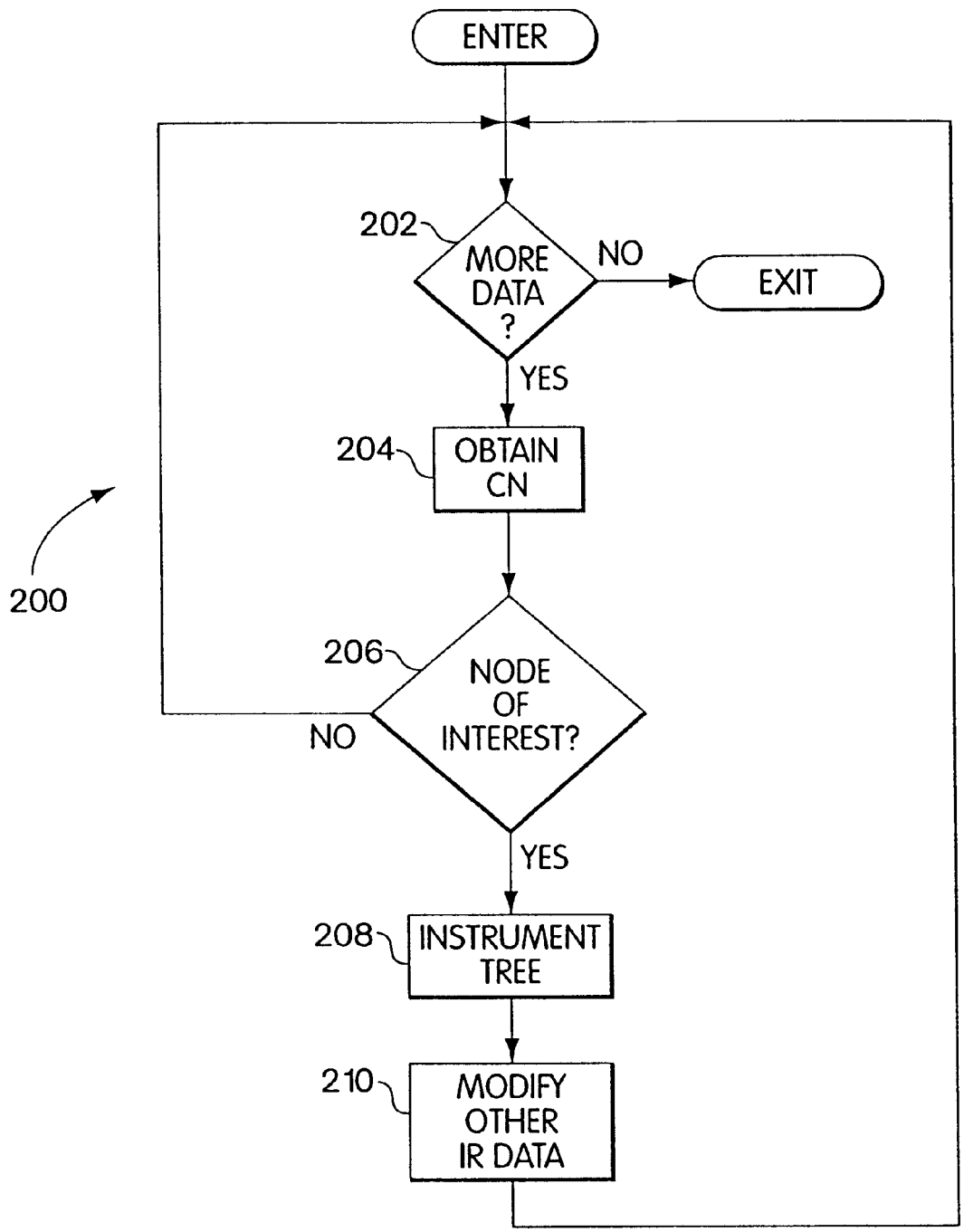
FIG. 7 is a flow chart illustrating instrumentation of the tree data structure of FIG. 5.

Referring to FIG. 7, a flowchart 200 illustrates operation of the instrumentation software 63 of FIG. 4. The instrumentation software 63 examines data found within the IR data element 64 and, in a manner discussed in more detail below, provides instrumentation. Processing begins at a test step 202 where it is determined if there is more data (i.e., more nodes) to examine. Note that the data that is processed could be either directly from the IR data element 64 or could be from the flat list of IR nodes, discussed above, that may be created in connection with creating the IR tree 80. If it is determined at the test step 202 that there is no more data to process (i.e., the end of the list or the end of the file containing the data has been reached), then processing is complete and the routine of FIG. 7 is exited.

If it is determined at the test step 202 that there is more data to be processed, then control passes from the test step 202 to a step 204 where the current node (CN) is obtained. In a manner similar to that discussed above in connection with construction of the IR tree 80, obtaining the CN may include reading the CN directly from the IR data element 64 or simply obtaining the next node in the flat list of nodes that may have been constructed prior to building the IR tree 80.

Following the step 204 is a test step 206 where it is determined if the CN is a node of interest. As discussed in more detail below, a node of interest includes any node that is to be instrumented or which indicates that instrumentation is appropriate. Identifying which nodes are nodes of interest at the test step 206 is discussed in more detail hereinafter.

If it is determined at the test step 206 that the CN is not a node of interest, then control passes from the test step 206 back up to the step 202 where it is determined if there is more data to be processed, as discussed above. Otherwise, if it is determined at the test step 206 that the CN is a node of interest, then control passes from the test step 206 to a step 208 where a portion of the IR tree 80 is instrumented, either by replacing the CN and/or adding additional nodes the near location of the CN in the tree 80. Following the step 208 is a step 210 where other IR data is modified, as appropriate. Following the step 210, control passes back to the step 202 to determine if there is more data to be processed.

Generally, it is possible to instrument any one or any subset of a variety of the nodes found in the IR tree 80. In many instances, however it is useful to instrument memory access instructions in order to detect illegal memory operations at run time. In addition, for many higher-level languages, variables that may be defined locally within a particular code block (such as a function) become undefined once that code block is exited. Accordingly, monitoring the variables of a program that access memory may necessitate monitoring exiting and entering blocks of code where variables become defined and undefined. For instance, a pointer variable may be defined within a particular block of code and used to allocate memory from the heap. If that block of code is exited before the memory is released, this would, in many instances, constitute an error since there would be no way to free the memory allocated using the (subsequently undefined) pointer variable.

In a preferred embodiment, the system described herein determines nodes of interest at the test step 206 by determining if the CN corresponds to one of: a pointer arithmetic operation that compares pointers or does pointer arithmetic, an operation that reads memory locations, an operation that changes memory locations, or an operation that causes variables to become defined or undefined, such as a scope change, a goto statement, a function call or a return from a function call. In the case of memory variable operations, whenever a variable is used to read memory, the run time instrumentation routines determine if the variable corresponds to memory that has been allocated and initialized.

Similarly, if a variable is being used to write memory, the run time instrumentation routines determine if the variable corresponds to memory that has been allocated. Pointer comparisons are instrumented since it is often not proper to compare pointers that point to blocks of memory allocated by separate calls to the allocation routine(s). Operations that read or write to memory locations are instrumented to ensure that the memory variable(s) being used point to the memory allocated for the variable(s) during the read or write operation (e.g., an array index does not cause an access to an array to point beyond the end of the array).

Function calls and returns may be instrumented for a variety of purposes, including keeping track of variables becoming defined or undefined in connection with function calls and returns. In addition, note that it is possible to pass a variable pointer to a function and have that pointer be assigned to another variable within the function. These types of operations are instrumented since, even if a local variable is used to allocate memory, if that local variable corresponds to a passed variable, then it may not be improper to return from the function before freeing the memory allocated using the local variable.

Each block of code has a particular "scope" associated therewith. Transition from a block of code having one scope to a block of code having another scope is called a "scope change". One reason scope changing instructions are instrumented is to detect memory leaks (i.e., allocating memory that is not subsequently freed). As discussed above, it is an error to allocate memory to a local variable and then return or exit out of the scope which defines the local variable without first freeing the memory or copying a pointer for the memory to a variable that is not going out of scope. Another reason that scope changes are instrumented is to detect read accesses to unitialized variables. Note that associating blocks of code with particular scopes is known in the art. See, for example, a section titled "Representing Scope Information" at pages 438–440 of Aho, Seth & Ullman, *Compilers, Principles, Techniques, and Tools,* published by Addison-Wesley of Reading Mass., 1986.

One possible optimization is to not instrument scope changes that have minimal effect on monitoring variable operations. This optimization may be performed by first determining the scope of each portion of the IR code and then setting an effective scope of appropriate portions of the code to the effective scope of the immediately preceding block of code. In some instances, the block of code that immediately precedes the current block of code is the "parent" block of code. A preceding block of code is said to have a "preceding scope" relative to the current scope. For instance, in some higher level languages, a FOR loop will cause a scope change in connection with transition from the head of the loop to the body of the code that is executed within the loop. Thus, the scope of the head of the FOR loop is the preceding scope of the body of the FOR loop.

An effective scope table indicates the effective scope of each block of IR code. As discussed in more detail below, the effective scope of a portion of IR code is deemed to be the scope of that portion for purposes of instrumenting operations that use program variables. The effective scope table creates a mapping between the actual scope and the effective scope of blocks of the IR code.

Figure 8:
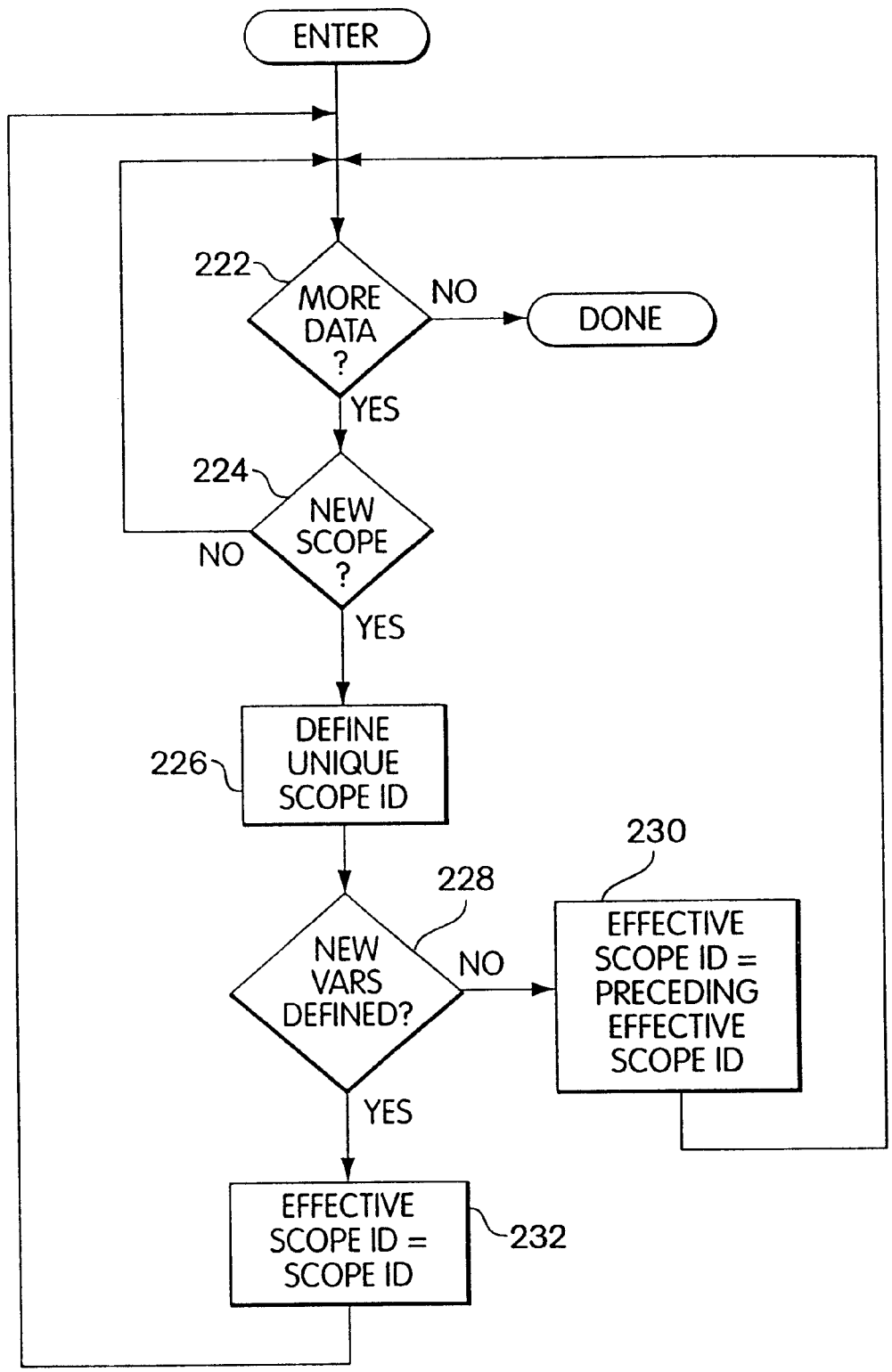
FIG. 8 is a flow chart illustrating construction of an effective scope table used in connection with instrumenting the tree data structure of FIG. 5.

Referring to FIG. 8, a flow chart 220 illustrates using the IR code to construct the effective scope table. Processing begins at a test step 222 which determines if there is more data to be processed, in a manner similar to that discussed above in connection with other processing. If it is determined at the test step 222 that there is no more data, then processing is complete. Otherwise, control passes from the test step 222 to a test step 224 which determines if the data that has been read in and is being processed indicates a scope change. Note that, depending on the specific IR implementation, a scope change may be indicated explicitly within the IR data or may be indicated implicitly, in which case the processing at the test step 224 would use conventional means for detecting a scope change, such as examining the data for the type of instructions that cause a scope change.

If it is determined at the test step 224 that there is no scope change, then control passes back to the test step 222 to determine if there is more data to be processed. Otherwise, if a scope change is detected at the test step 224, then control passes from the step 224 to a step 226 where a unique scope identifier is defined and assigned to the code block being processed. Construction of the effective scope table includes providing a unique scope identifier for each block of IR code having the same scope. Accordingly, one of the entries in the effective scope table is the unique scope identifier associated with each of the IR code blocks.

Following the step 226 is a test step 228 which determines if new variables are being defined within the block of code corresponding to the current scope. The variable definitions may be stored in the IR tree 80 or may be stored elsewhere, depending upon the specific implementation of the IR. If no new variables are defined within the current scope, then, for purposes of instrumenting memory variable accesses, it is not necessary to instrument the scope change. Accordingly, if it is determined at the test step 228 that no new variables are defined within the block of code corresponding to the current scope, then control passes from the step 228 to a step 230 where the effective scope of the current block of code is set equal to the effective scope of to the preceding block of code by associating the effective scope of the preceding block with the current scope. Note that setting the effective scope of the current block of code to the effective scope of the preceding block of code indicates that the scope change from the preceding block of code to the current block of code is not especially significant for purposes of instrumenting variable accesses. Note also that the effective scope of a preceding block may have been previously set to the effective scope of the preceding block of the preceding block. In this way, many scopes may be set to the same effective scope.

If it is determined at the test step 228 that new variables are defined within the current block of IR code, then control passes from the step 228 to a step 232 where the effective scope table is modified to indicate that the effective scope of the current block of code is equal to the actual scope assigned to that block of code. Following either the step 230 or the step 232, control passes back to the beginning of the routine. The thus-constructed effective scope table may be used to provide instrumentation optimizations, as discussed below.

Figure 9A:
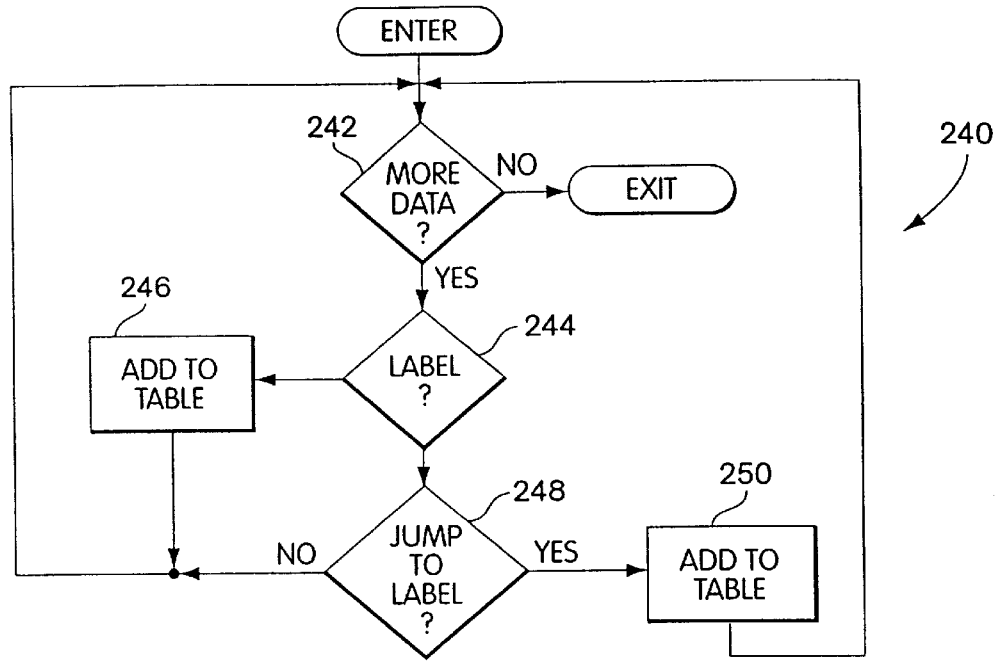
FIGS. 9A and 9B are flow charts illustrating scope optimization used in connection with instrumenting the tree data structure of FIG. 5.

Referring to FIG. 9A, a flow chart 240 illustrates code for identifying labels and jumps to labels within the IR code. Note that, in many conventional IR implementations, symbolic labels are used to identify locations within the code so that control flow instructions within the IR code may jump to those labels. In some instances, a jump to a label could cause a scope change and, therefore, could be instrumented if the jump causes program variables to become defined or become undefined. However, a possible optimization includes identifying labels that do not require instrumentation either because there are no jumps to those labels or because all jumps to those labels are from code having the same effective scope as the code corresponding to the label.

Processing begins at a test step 242 which determines if there is more data to be processed in a manner similar to that discussed above. If there is no more data, then processing is complete. Otherwise, control passes from the test step 242 to a test step 244 which determines if the current IR node being processed is a label for a block of IR code. If so, then control passes from the test step 244 to a step 246 where the label is added to a label table that is used by follow on processing, as discussed in more detail below.

If it is determined at the test step 244 that the data being processed is not a label, then control passes from the step 244 to a test step 248 which determines if the current data being processed includes IR code that jumps to a label. If not, then control passes from the test step 248 back to the step 242 to process additional data. Otherwise, if it is determined at the test step 248 that the current data being processed includes IR code that jumps to a label, then control passes from the step 248 to a step 250, where an entry is made to the label table. Following the step 250, control passes back to the beginning of the routine to process additional data. The processing illustrated in the flowchart 240 creates the label table to identify all labels and all jumps to labels within the IR code. Note that the term "table", as used herein, should be understood in its broader sense to include other equivalent data structures such as linked lists, storage in a temporary file, etc., familiar to one of ordinary skill in the art.

Figure 9B:
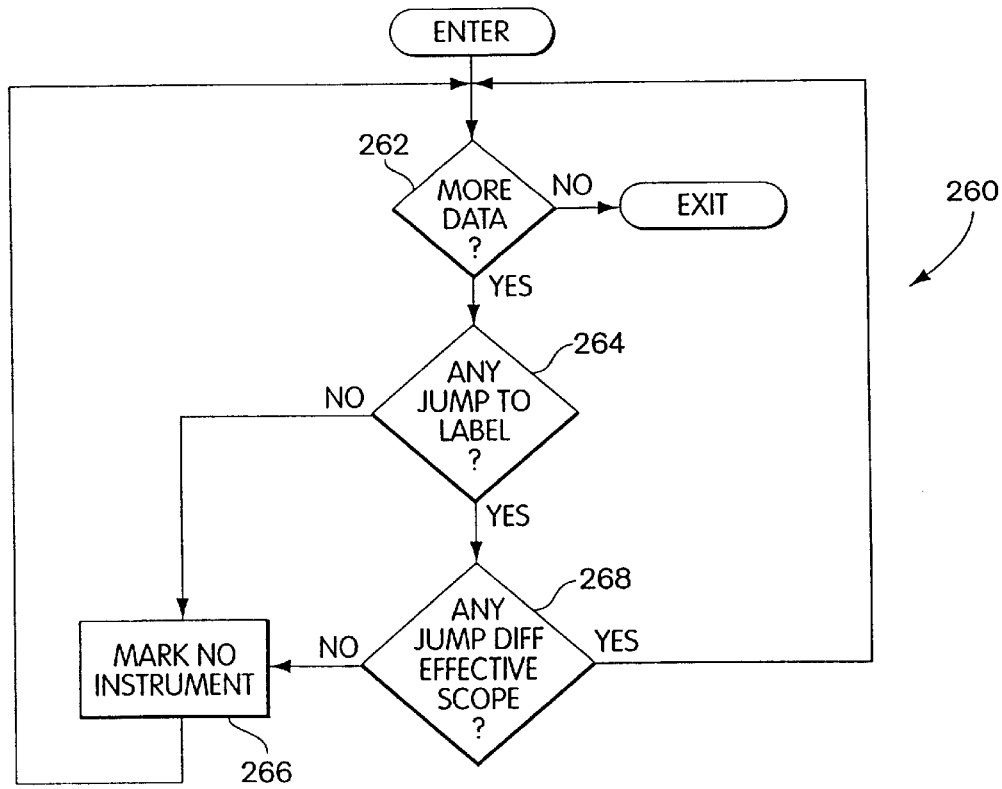

Referring to FIG. 9B, a flow chart 260 illustrates optimization operations that use the label table. Each label that is identified in the label table is examined to determine if there are any jumps to that label or if any of the jumps to the label are from IR code blocks having a different effective scope. Processing begins at a test step 262 which, in a manner similar to that discussed above, determines if there is more data to be processed. Note that, in this instance, the test for more data at the test step 262 is directed to processing each of the label entries in the label table.

If it is determined at the step 262 that there is no more data (i.e., there are no more labels to be processed), then processing is complete. Otherwise, if there are more labels to be processed, then control passes from the test step 262 to a test step 264 which examines the label table to determine if there are any jumps to the current label being processed. Note that, generally, it is possible for the compiler to generate IR code having labels that are ultimately not used (i.e., there is no IR code that jumps to the labels). Accordingly, if such labels exist, they are detected at the test step 264 and control passes to a step 266 where the label is marked (in a conventional manner) to indicate that the label is not to be instrumented. Following the step 266, control passes back to the beginning of the routine.

If, on the other hand, it is determined at the test step 264 that there are jumps to the label being processed, then control passes from the step 264 to a test step 268 where it is determined if any of the jumps to the label are from IR code having a different effective scope than that of the label. Note that at the steps 246, 250 of FIG. 9A, the label table entries may be made to include the effective scope (from the effective scope table) of IR code corresponding to the labels and the jumps to the labels. Accordingly, at the step 268, the effective scope of the IR code corresponding to the label is compared with the effective scopes of all of the code containing jumps to the label. If it is determined at the step 268 that none of the jumps to the label are from IR code having a different effective scope than the code associated with the label, then control passes from the step 268 to the step 266, where the label is marked to indicate that the label is not to be instrumented. Since the effective scope tracks variables becoming defined and undefined within a code block and between different code blocks, then marking certain labels at the step 266 provides a worthwhile optimization when instrumenting code in connection with run time variable accesses.

If it is determined at the step 268 that there are jumps to the label that cause a change in effective scope, then control passes from the test step 268 back to the beginning of the routine. Once all the labels have been thus marked, it is possible to perform the remainder of the processing indicated by the step 206 in FIG. 7 where the nodes of interest are identified for subsequent instrumentation. Note that it is possible to use a boolean variable to indicate whether a label node is to be instrumented.

Figure 10:
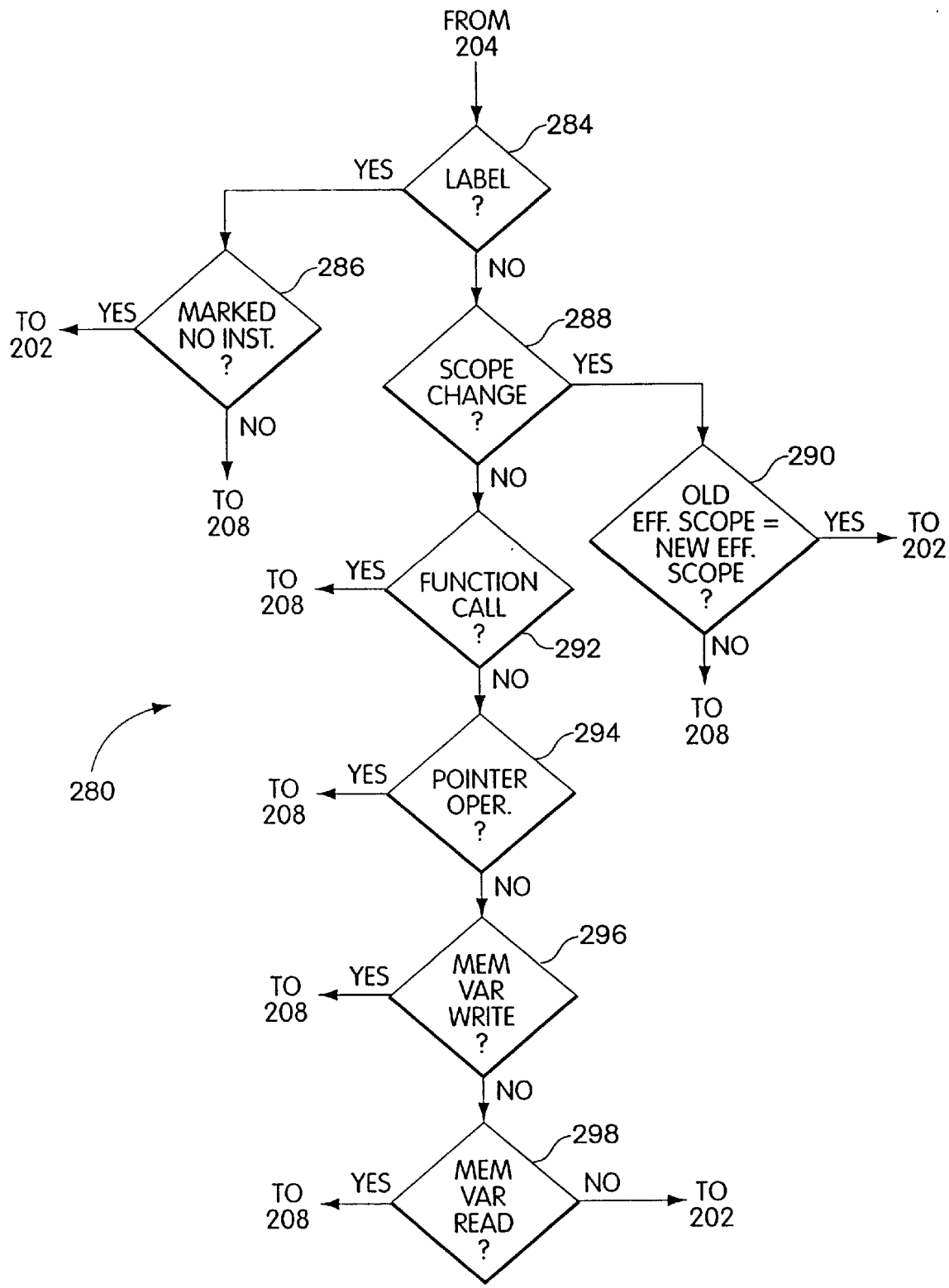
FIG. 10 is a flow chart illustrating in detail a portion of the flow chart of FIG. 7 where nodes are selected for instrumentation.

Referring to FIG. 10, a flowchart 280 illustrates a portion of the processing at the step 206 of FIG. 7 that determines which nodes in the IR code are to be instrumented. Processing begins at a test step 284, which is reached from the step 204 of FIG. 7. At the test step 284, it is determined if the data being processed corresponds to a label in the IR code. If so, then control passes from the test step 284 to a test step 286 to determine if the label has been marked to indicate that the label is not to be instrumented, as discussed above in connection with FIGS. 9A and 9B. If it is determined at the test step 286 that the label being processed has been marked to indicate that the label is not to be instrumented, then control passes from the test step 286 to the step 202 of FIG. 7. Otherwise, if it is determined that the test step 286 that the label is to be instrumented, then control passes from the step 286 to the step 208 of FIG. 7 where the IR tree 80 is instrumented.

If it is determined at the test step 284 that the data being processed is not a label, then control passes from the step 284 to a step 288 where it is determined if the data being processed indicates a scope change. If so, then control passes from the step 288 to a test step 290 to determine if the old effective scope (i.e., the effective scope before the scope change) equals the new effective scope (i.e., the effective scope after the scope change). The effective scope is discussed above in connection with construction of the effective scope table. If it is determined that the scope changed detected at the test step 288 does not cause a change in the effective scope, then control passes from the test step 290 to the step 202 of FIG. 7. Otherwise, if it is determined at the test step 290 that the old effective scope does not equal the new effective scope, then control passes from the step 290 to the step 208 of FIG. 7 where the tree 80 is instrumented.

If it is determined at the step 288 that the data being processed does not cause a scope change, then control passes from the step 288 to a test step 292 where is determined if the data being processed is a function call. If so, then control passes from the test step 292 to the step 208 of FIG. 7. Otherwise, control passes from the test step 292 to a test step 294 which determines if the data being processed is a pointer operation. If so, then control passes from the test step 294 to the step 208 of FIG. 7. Otherwise, control passes from the test step 294 to a test step 296 where it is determined if the data being processed is a memory write operation (i.e. an operation with a program variable causing a write to memory). If so, then control passes from the test step 296 to the step 208 of FIG. 7. Otherwise, control passes from the step 296 to a test step 298 which determines if the data being processed relates to a memory read (i.e., is an operation with a program variable causing a read from memory). If so, then control passes from the test step 298 to the step 208 of FIG. 7. Otherwise, control transfers from the step 298 to the step 202 of FIG. 7.

FIG. 10 illustrates an embodiment of the invention where the instructions being instrumented relate to memory variable accesses and scope changes. In other embodiments of the invention, it is possible to instrument other types of IR instructions, depending upon which instructions are deemed appropriate for monitoring program operation at run time. For example, it may be possible to add instrumentation to monitor run time performance of the program. Other examples of possible uses of instrumentation include, but are not limited to, code coverage analysis and run time error handling.

Instrumenting memory variable accesses and scope changes, as disclosed herein, facilitates uncovering program errors relating to memory read and write operations that occurred during run time. Note that the specific IR operations, and the arguments thereof, vary depending upon the particular implementation of the IR. In addition, as discussed above, the choice of which operations to instrument varies depending upon the needs of the user of the instrumentation program.

The step 208 of instrumenting the IR tree, which is shown as FIG. 7, involves adding nodes to the tree that assist in the performance of the run time instrumentation. As discussed in more detail below, each of the specific run time instrumentation routines that is provided may include a function that is called to perform the instrumentation operation. Note that the instrumentation calls are added in a way that has no net effect on the underlying, uninstrumented, program. That is, the behavior of the IR code with the run time instrumentation routines added thereto has to be the same as the behavior of the original IR code without the instrumentation routines added. Thus, the instrumentation routines may add new variables, but do not change any of the program variables except in instances where the value of a program variable is undefined. The additional nodes, instrumentation function calls, etc. may be provided by the instrumentation data element 69 shown in FIG. 4.

Figure 11A:
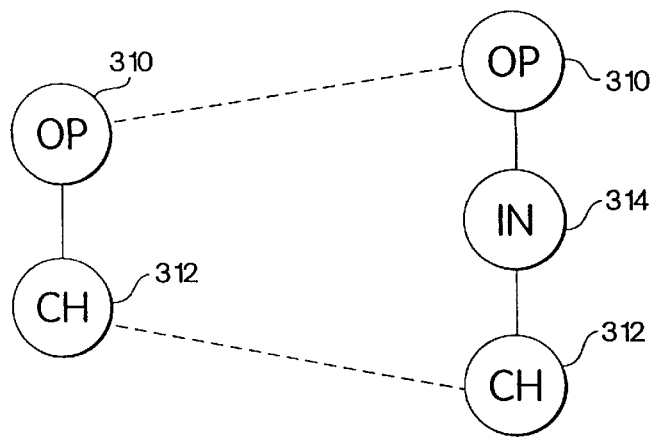
FIGS. 11A, 11B, and 11C illustrate insertion of nodes in connection with instrumentation of the tree data structure of FIG. 5.

Referring to FIG. 11A, a portion of an IR tree is shown containing a unary operation node 310 and a child node 312 thereof The operation node 310 represents a node of interest that is to be instrumented. The child node 312 represents the sole child of the operation node 310. In order to instrument the operation node 310, a run time instrumentation node 314 is interjected between the operation node 310 and the child node 312. The run time instrumentation node 314 may be a function call to a run time instrumentation function that uses the child node 312 as one of the arguments and returns the value of the child node 312 from the function call to make the value available for the operation node 310. Interjecting the run time instrumentation node 314 between the operation node 310 and the child node 3 12 in this manner is virtually transparent to the operation node 310, since the value returned by the run time instrumentation node 314 is the value of the child node 312. Note that other arguments may be provided in a conventional manner to the function corresponding to the run time instrumentation node.

Figure 11B:
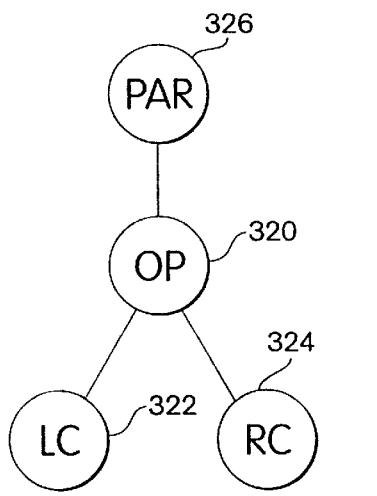

Refer to FIG. 11B, a binary operation node 320 has a left child 322, a right child 324, and a parent node 326. If the operation node 320 is a node of interest, then it may be instrumented by interjecting various nodes that are effectively transparent to the operation node 320 as well as effectively transparent to the left child 322, the right child 324 and the parent node 326.

Figure 11C:
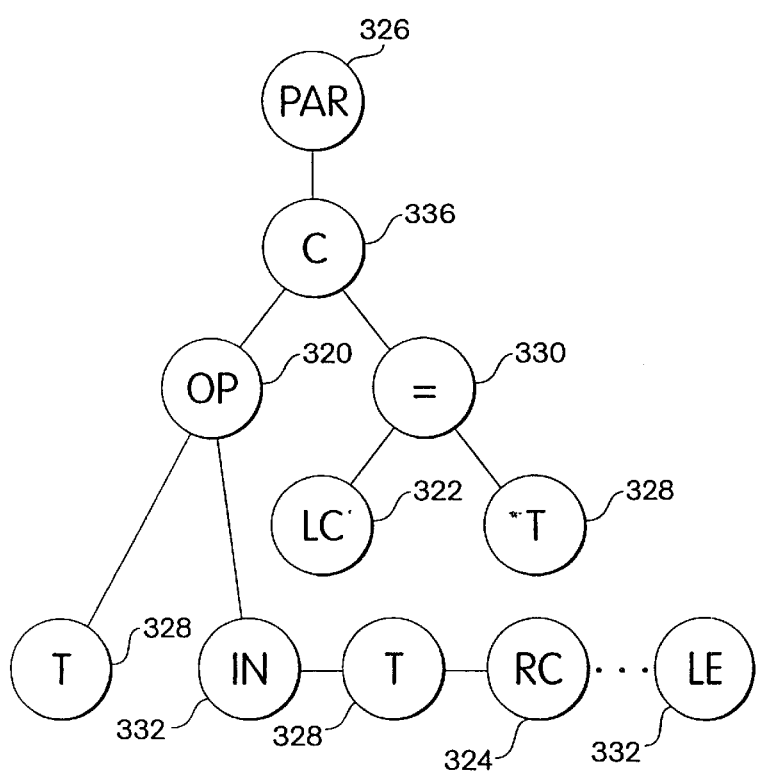

Referring to FIG. 11C, the operation node 320 is instrumented by adding a variety of other nodes. One of the other nodes that is added is a temporary node 328 that is used to store the value of the left child 322. An assignment node 330 is used to assign the value that results from evaluating the left child 322 to the value of the temporary node 328. As discussed below, right subtree is evaluated before the left subtree. Thus, the operation that evaluates the value of the left child and assigns the value to the temporary node 328 will occur before other operations shown in FIG. 11C.

An instrumentation node 332 is represented in the sub-tree of FIG. 11C as a function having arguments that include the temporary node 328 and the right child 324. Since the arguments to the function that corresponds to the instrumentation node 332 are illustrated as a list, then a list end node 334 is shown at the end of the list. Other arguments to the instrumentation node 332, as well as arguments to the instrumentation node 314 of FIG. 11A may include a variety of other conventional compile time and run time parameters that facilitate debugging.

The function defined by the instrumentation node 332 returns the result of evaluating the right child 324. Thus, the next operation is the operation of the instrumented node 320, which receives the value of the temporary node 328 and the value of the instrumentation function 332. Note that, as discussed above, the value of the temporary node 328 is the value of the left child 322 and the value of the function defined by the instrumentation node 332 is the value of the right child 324. Thus, the operation node 320 is provided with values for children that are the same as those provided to the operation node 320 shown in FIG. 11B. The node labeled "C" 336 of FIG. 11C simply causes execution of the right sub-tree (in this case having a root node 330 that does the assignment of the value of the left child 322 to the temporary node 328) followed by the operation of the left sub-tree (in this case the operation being instrumented 320). The node labeled "C" 336 provides the value derived from the operation node 320 to the parent node 326. Thus, the parent node 326 in FIG. 11C receives the same value provided to the parent node 326 in the configuration show in FIG. 11B. Instrumentation of the binary node illustrated in FIGS. 11B and 11C is expandable to ternary and to nodes having even more children using this same basic methodology described herein.

The run time instrumentation code may be implemented by using a separate set of routines (such as a DLL under the Windows environment) that is linkable to the code being instrumented via the function calls provided to the IR code in the course of instrumentation. In a preferred embodiment, the function calls are performed by indirectly calling functions that are initially set to an initialization routine that initializes the run time instrumentation system. The initialization routine determines if an executable library corresponding to the run time instrumentation routine is available. If not, then the addresses of the functions that are called indirectly by the indirect function calls added by instrumentation are set to "stub" routines that simply return without executing anything. Accordingly, even if the user program has been instrumented, if the run time instrumentation program is not also available during run time, then the instrumented code will simply return from the instrumentation function calls.

If, on the other hand, the initialization routine determines that the executable library for providing instrumentation during run time is available, then the addresses of the functions that are called indirectly by the instrumentation nodes are set to the instrumentation routines. The run time instrumentation routines that are used depend on the nature of the IR code being instrumented. Generally, the instrumentation routines may be fairly conventional and test for run time error conditions such as memory leaks (i.e., a scope change that causes a pointer variable to become undefined prior to freeing the allocated memory associated with the pointed variable). Other detected errors may include memory write operations that use variables that do not point to memory that is allocated to the variable, memory read operations that use memory variables that do not point to memory that is either allocated for the variable or, if allocated, then is not initialized. In addition, modifications to pointer variables may be instrumented to ensure that the pointer variables point to the proper allocated block of memory. Other run time instrumentation routines may test and compare the size of variables in connection with a data read from one memory location into another, test for indirect calls to assure that the pointer used points to executable code, and test that pointers that are compared are allocated to the same block of memory.

Once the IR tree 80 has been instrumented in the manner discussed above to create the instrumented IR tree data element 67, the tree deconstruction software 70 of FIG. 4 collapses the IR tree stored in the instrumented IR tree data element 67 and uses the other IR data element 68 to provide the instrumental IR Data Element 65. Collapsing the IR tree back into a flat file is a simple matter of using the conventional post order traversal algorithm to first write the right child sub-tree of each node, then the left child sub-tree, then the actual node. For the combo node, after the child tree is written, the list is processed, treating each item in the list as a top-level node in its own tree. This process is essentially the inverse of the process used to construct the IR tree, discussed above.

The other IR data element 68 shown in FIG. 4 may include a global symbol table that contains locations of each function contained in the IR code. Note that since IR code is being supplemented (i.e., increased in size) by the instrumentation process, then generally, the location of each of the functions within the IR code is likely to move. The locations of each of the functions are stored in the other IR data element 68 and are written back to the other IR data element 68 as the IR tree 80 is collapsed into a flat list by the tree deconstruction software 70 shown in FIG. 4. Note that global function symbols within the global symbol table, and corresponding functions within the IR tree, may be correlated in a conventional manner by using symbol keys that cross-reference items between the IR code and the items in global symbols table.

Once the instrumented IR data element 65 is provided, then, as shown in FIG. 3, the compiler 42 may continue the compile process by accessing the instrumented IR data element 65 to provide the object code 46. Instrumenting the IR code in this way is virtually transparent to the compiler 42 since the IR data element 64 and the instrumented IR data element 65 have virtually the same structure. The thus-provided object code 46 contains the additional nodes added during instrumentation, including the run time function calls that call the run time debugging routines.

During execution of the object code, errors may be indicated by the run time debugging routines in any one of a variety of conventional manners, including providing an indication on the screen and stopping execution of the code when the error occurs, logging errors to a file, or any one of a variety of other ways for indicating to a user that a run time error condition, or a potential run time error condition, has occurred.

Other embodiments also exist. Described below are methods of automatically editing the executable byte code representation of a computer program or other methods for generating instrumented byte code. In one embodiment, the byte code is altered by the addition of new instructions and/or the deletion or modification of existing instructions.

Byte code is a generic term for a family of binary (i.e., non-textual) file formats for computer software programs created by compiling source code written in a computer programming language. Byte code is a format that is usually independent of the source language from which it was compiled, and which is intended to be independent of any computer hardware and/or operating system on which it might run. Byte code programs are executed by a software program sometimes referred to as a virtual machine, byte-code interpreter or p-code interpreter, a separate version of which must be implemented for each computer hardware and/or operating system.

One objective of the editing process is to alter the program to facilitate the gathering of diagnostic and statistical information on the program when it is executed; i.e., dynamic analysis. This allows the program's internal state to be monitored for variety of purposes. These purposes include, but are not limited to: diagnosing error conditions that occur at run time, creating a record of the inner details of program execution, measuring program execution to provide code coverage analysis and performance profiling, or providing additional run time error or exception handling.

Another objective of the editing process is to examine the byte code according to various heuristics; i.e., static analysis. Through static analysis, several types of useful information may be derived. These include, but are not limited to: code metrics and complexity analysis, usage information (including library usage), and enhanced symbolic information for debugging.

Static analysis also makes it possible to detect some types of errors that might not be caught at runtime, since it is difficult to guarantee that all code will actually be executed under all circumstances. These errors include, but are not limited to: improper parameter lists passed to functions, methods or procedures, and use of uninitialized variables.

There are many different ways to instrument byte code. In one embodiment, the editing is performed automatically as a separate post-compile process before the byte code is executed. In another embodiment, the editing is performed automatically by the run time environment itself, which has been modified to alter the code before it is executed. In a third embodiment, the final stage 55 of the compiler 42 shown in FIG. 3 generates instrumented byte code from the instrumented IR data 65 rather than generating the object code 46, as described above.

As mentioned above, instrumentation may be used to accumulate profile and timing data for an application. As described in detail below, an application may be compiled and instrumented to include calls that accumulate profile data. This profile data may include the amount of time spent in a particular process and/or thread, amount of time spent executing particular lines of code, amount of time executing a particular function, number of times particular lines of code are called, and, generally, timing and frequency information for any subset of code in the application that has been appropriately instrumented, as described in detail below.

Figure 12:
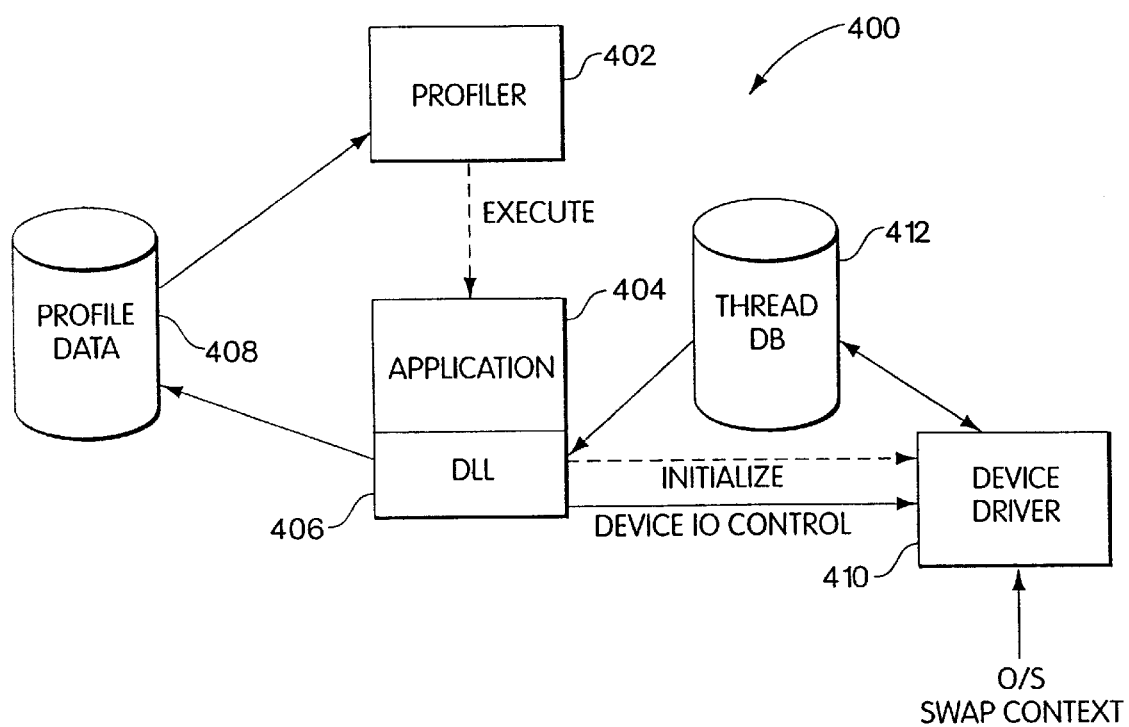
FIG. 12 is a flow diagram illustrating operation of a timing profiler according to the present invention.

Referring to FIG. 12, a profiling system 400 is provided for obtaining execution time information of portions of code. In a multi-tasking environment, determining execution times for portions of code may involve accounting for time that the code is swapped out by the operating system.

The profiling system 400 includes a profiler 402 that executes an application 404 having a DLL (Dynamic Link Library) 406 associated therewith that facilitates collection of profile data 408. In some embodiments, no stubs are provided to the DLL routine calls. Thus, profiling does not occur if the DLL is not present. The profiler 402 provides a user interface to display the profile data 408 in a conventional manner. Collecting and displaying program profiling information in a single tasking environment is generally known. Facilitating the collection of the profiling data 408 in a multi-tasking environment is discussed in more detail below.

A profile device driver 410 provides a mechanism to ascertain an amount of time that a particular executable block of code is swapped in and swapped out by the operating system and provides that data to a thread database 412. As discussed in more detail below, the DLL 406 of the instrumented application 404 uses the thread data base 412 to calculate execution times of the blocks of code and to provide data indicative of those execution times to the profile data 408. The thread database 412 is provided in a shared memory section that is accessable to both the device driver 410 and the DLL 406 associated with the application 404.

The profiling system 400 show in FIG. 12 may be used in a Windows NT or a Windows 95 operating system environment. In addition, as is apparent from the discussion herein, the system 400 may be adapted by one of ordinary skill in the art to be used in other multi-tasking operating system environments by taking into account the specific implementations of those operating systems and the relationship of those implementations and the executable application code.

In the Windows NT environment, the device driver 410 may be implemented as a kernel mode device driver. In Windows 95, the device driver 410 may be implemented as a virtual device driver (VxD). For Windows NT, the operating system is modified slightly so that a call to an operating system routine that swaps threads in and out (a swap context routine) first executes the device driver 410 to provide processing that is discussed in more detail below. The device driver 410 is a load-on-demand driver that is initialized by the DLL 406 of the application 404, which loads the driver 410 the first time it is used.

When the device driver 410 is first loaded, the operating system calls an initialization routine of the device driver 410. The initialization routine locates the swap context routine in the Windows NT operating system by scanning the operating system code looking for the SwapContextNotifyPointer and determining the location of the swap context routine from that. The location of the beginning of the swap context routine is used to patch the memory addresses corresponding thereto to make a call to the device driver 410, which performs the processing discussed in more detail below and then returns to the operating system's swap context routine to continue normal execution thereof In some embodiments, the initialization routine makes the patch. In other embodiments, the patch is made the first time a thread is selected for monitoring.

Locating and patching the swap context routine in this manner may be performed by one of ordinary skill in the art using conventional reverse engineering techniques and using publicly available information concerning the Windows NT operating system. For example, for Windows NT version 4.0, an initialization portion of the device driver 410 first searches for the following Intel family assembly language instruction:

mov byte ptr es:[esi+2dh],2

The search begins at an address "KiDispatchInterrupt", which is exported by NTOSKRNL.EXE which contains the core of the operating system. Once the above instruction is found, the initialization routine searches for the following code sequence:

cmp dword ptr[SwapContextNotifyPointer],0
    jz label
    mov edx, [esi+1e4]
    mov ecx, [edi+1e4]
    call [SwapContextNotifyPointer]
    label:

Once this code segment is found, then the address SwapContextNotifyPointer is patched with the address of the entry point in the device driver 410 that processes the operating system call to swap context. In some instances, it may not be possible to find the opcodes corresponding to cmp dword ptr[SwapContextNotifyPointer],0. In that case, the instruction for mov byte ptr es:[esi+2dh],2 (described above) is patched so as to cause a jump to the device driver 410. Other conventional techniques exist for patenting the operating system to cause an operating system call to swap context to enter the device driver 410. In addition, the Windows 95 operating system provides a documented mechanism for causing a context swap to also call a user supplied routine.

The DLL 406 of the application 404 makes calls to the device driver 410 via the documented API call to DeviceIOControl. The parameters for the DeviceIOControl routine indicate one of four operations: process attach, process detach, thread attach or thread detach. When the instrumented application is first executed, an API ("CreateFile") is called to load the device driver 410. Thereafter, the DLL 406 of the application 404 performs DeviceIOControl calls to the device driver 410 when the application is first started, when the application exits, when the application creates a new thread, and when the application terminates a thread. Processing the DeviceIOControl calls by the device driver 410 is disclosed in more detail hereinafter.

Figure 13:
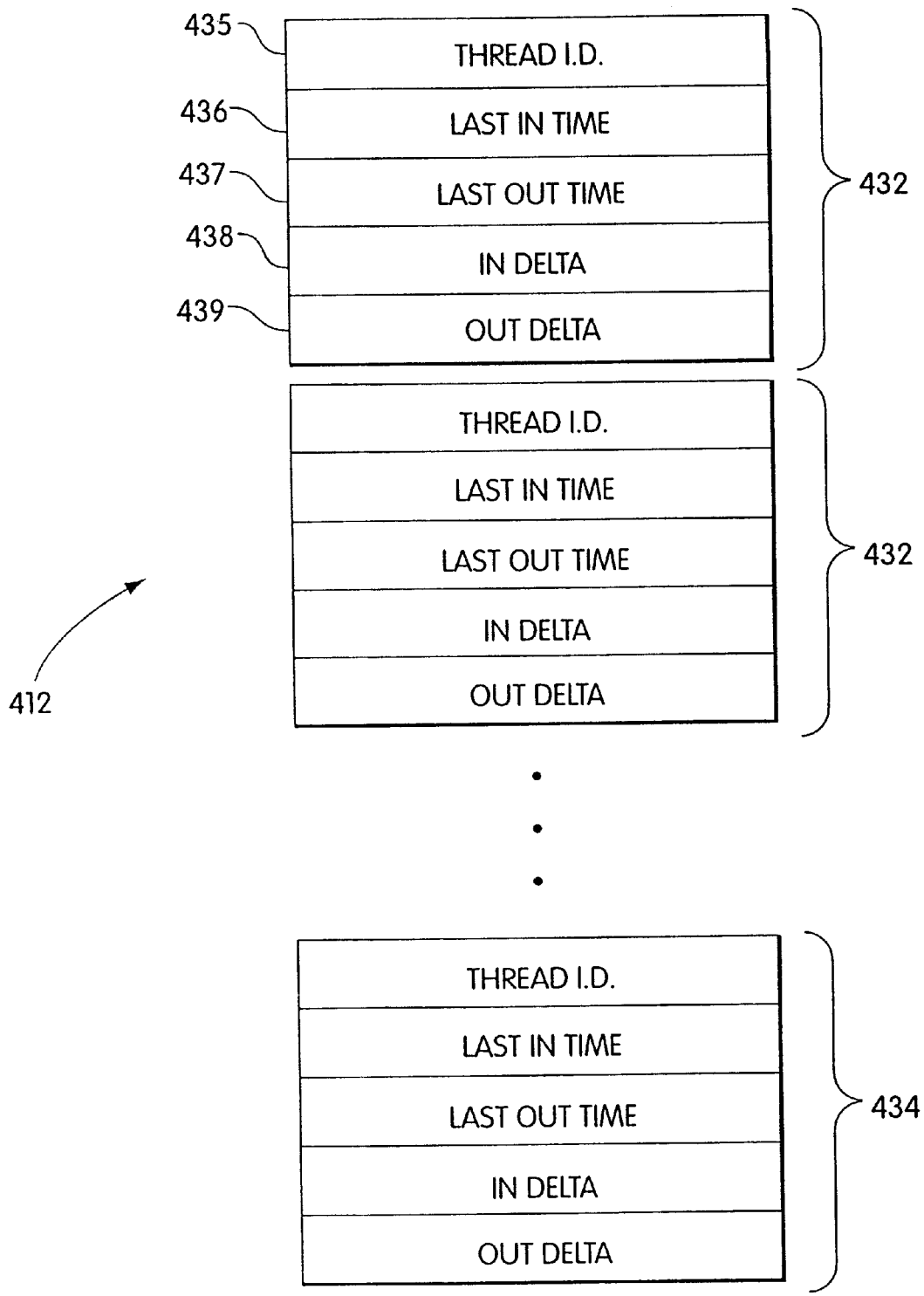
FIG. 13 illustrates a data structure of a thread database used by the timing profiler according to the present invention.

Referring to FIG. 13, a data structure diagram shows the structure of the thread database 412. The thread database 412 contains a plurality of records 432–434, each of which corresponds to a particular thread that is being profiled. Each record contains a plurality of fields 435–439. The field 435 is a thread i.d. field that identifies the particular thread corresponding to the record 432. In the Windows NT operating system, each thread has a unique i.d. In Windows 95, each thread also has a unique i.d. but, in some cases, it may be useful to translate the i.d. provided by the operating system into numbers that may be used to index the records 432–434 of the thread database 412.

The field 436 indicates the last in time of the thread associated with the record 432. The field 436 is the time read from the system clock when the thread corresponding to the record 432 was last swapped in (i.e., last provided access to the processor in the multi-tasking operating system). Similarly, the field 437 indicates the time of the system clock when the thread associated with the record 432 was last swapped out (i.e., made to relinquish access to the processor). The field 438 is labeled "indelta" to indicate that the field 438 is the accumulative amount of time that the thread associated with the record 432 has been provided access to the processor since beginning monitoring of the thread. Similarly, the field 439 labeled "outdelta" represents the total amount of time that the thread associated with the record 432 is swapped out.

The thread database 412 is thus a collection of records 432–434 for each of the threads that is being profiled. Note that the records 432–434 may contain other data fields and that the records 432–434 may be stored in the thread database 412 as an array, a linked list, or by using any other appropriate, conventional data storage mechanism.

Figure 14:
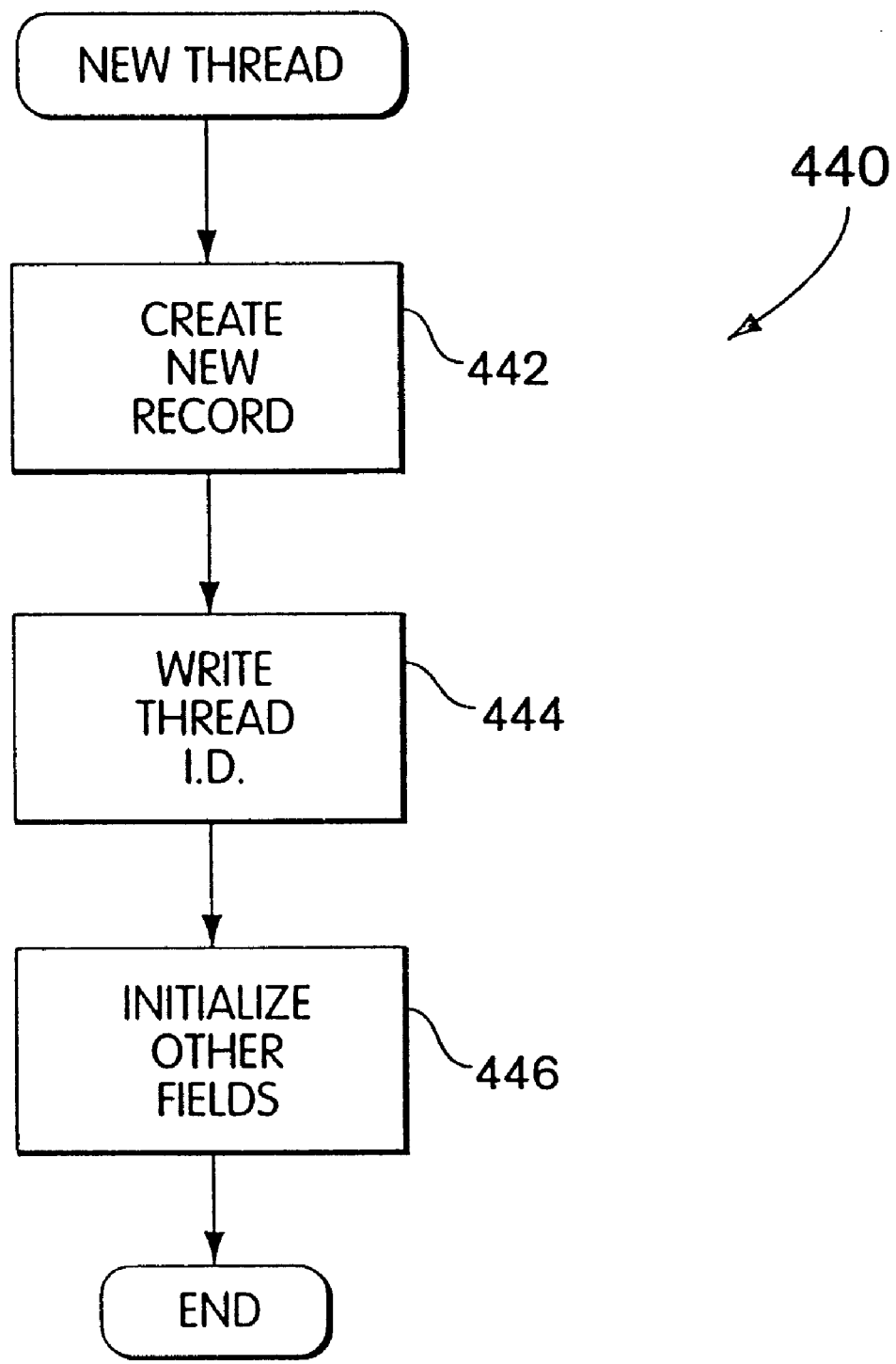
FIG. 14 is a flow chart illustrating initialization of a thread database record provided in the thread database.

Referring to FIG. 14, a flow chart 440 indicates operations performed by the device driver 410 when it receives an indication that a new thread is being created via the DeviceIOControl call. Note that creation of a new thread is indicated by the DeviceIOControl call providing a thread attach message. In the case of a new process, the first thread attach message is proceeded by a process attach message. The first thread for the application provides a process attach message to the driver 410 followed by a thread attach message for the initial thread.

Processing begins at a first step 442 where a new record is created for the thread. The record is similar to those records 432–434 shown in FIG. 13. Following step 442 is a step 444 where the thread i.d. is written into the record. In some instances, the thread i.d. provided by the operating system may be mapped into a more convenient identifier. Following the step 444 is a step 446 where the other values of the record are initialized, for example, to zero.

Figure 15:
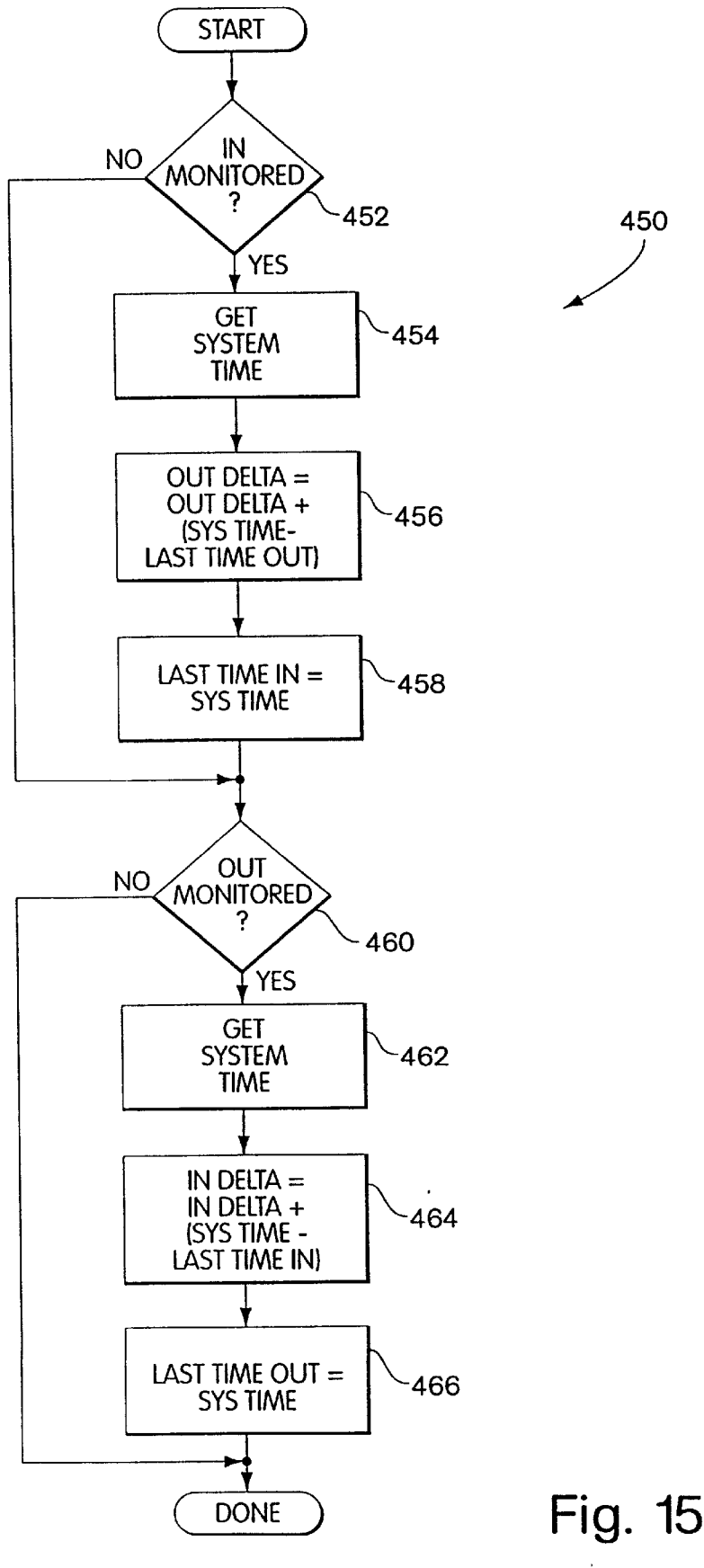
FIG. 15 is a flow chart illustrating operation of a device driver used to collect information for the thread database.

Referring to FIG. 15, a flow chart 450 shows operations that are performed in connection with an operating systems swap context routine that has been patched to make a call into the device driver 410, as discussed above. Processing begins a first test step 452 where it is determined if the thread being swapped in is being monitored by the profiler 402. Note that the parameters to the swap context routine include an identifier of the thread being swapped in as well as an identifier of the thread being swapped out. Thus, at the test step 452, the identifier of the thread being swapped in is compared with the thread identifiers stored in the thread database 412 and described above in connection with FIG. 13. If the thread being swapped in is found in the thread database 412, then control passes from the test step 452 to a step 454 where the device driver 410 obtains the system time. In a preferred embodiment of the present invention, the system time is obtained using an assembly language opcode for the Intel family of processors that returns a system time that is internal to the processor. For other processors, there may be other assembly language opcodes, or other conventional techniques, for obtaining the system time.

Following step 454 is a step 456 where the outdelta value is calculated. As discussed above, the outdelta field is the sum total of the amount of time that the thread has spent being swapped out since monitoring began. Thus, at the step 456, outdelta is incremented by an amount equal to lasttimeout field for the thread minus the system time. As discussed above, the lasttimeout is the value of the system time at the moment that a particular thread was last swapped out. Thus, the quantity lasttimeout minus the current system time is the amount of time that the thread has spent being swapped out since that last time the thread was swapped in. Accordingly, incrementing outdelta by this amount provides a new value for outdelta equal to all of the time that the thread has spent being swapped out since monitoring of the thread began. Following this step 456 is a step 458 where the lasttimein field of the thread database record is set to the current system time since the thread is currently being swapped in.

Following the step 458 is a step 460 where it is determined if the thread being swapped out is a thread that is being monitored. Note that the step 460 is also reached from the step 452 when it is determined at the step 452 that the thread being swapped in is not being monitored.

If it is determined at the test step 460 that the thread being swapped out is being monitored, then control passes from the test step 460 to a step 462 where the device driver 410 obtains the system time in a manner similar to obtaining the system time at the step 454, discussed above. Following step 462 is a step 464 where the indelta value is incremented by an amount equal to the system time minus the last time in. Note that since the task is being swapped out, then the quantity system time minus lasttimein reflects the amount of time that the thread has spent being swapped in. Thus, the new value of indelta is incremented by this amount of time that the thread has spent being swapped in for this iteration. Following the step 464 is a step 466 where the lasttimeout is set equal to the current system time. Following the step 466, processing is complete. Note that processing is also complete if it is determined at the step 460 that the thread being swapped out is not being monitored. Once processing is complete, the device driver 410 transfers control back to the operating system code that is otherwise executed in connection with the swap context routine. Thus, in most instances, the patch to the operating system that causes a call to the swap context routine to first call the device driver 410 is transparent to the applications running on the system.

The application can use the information in the thread database 412 to provide timing information for portions of code in the application. The general manner in which this occurs is discussed below.

Figure 16:
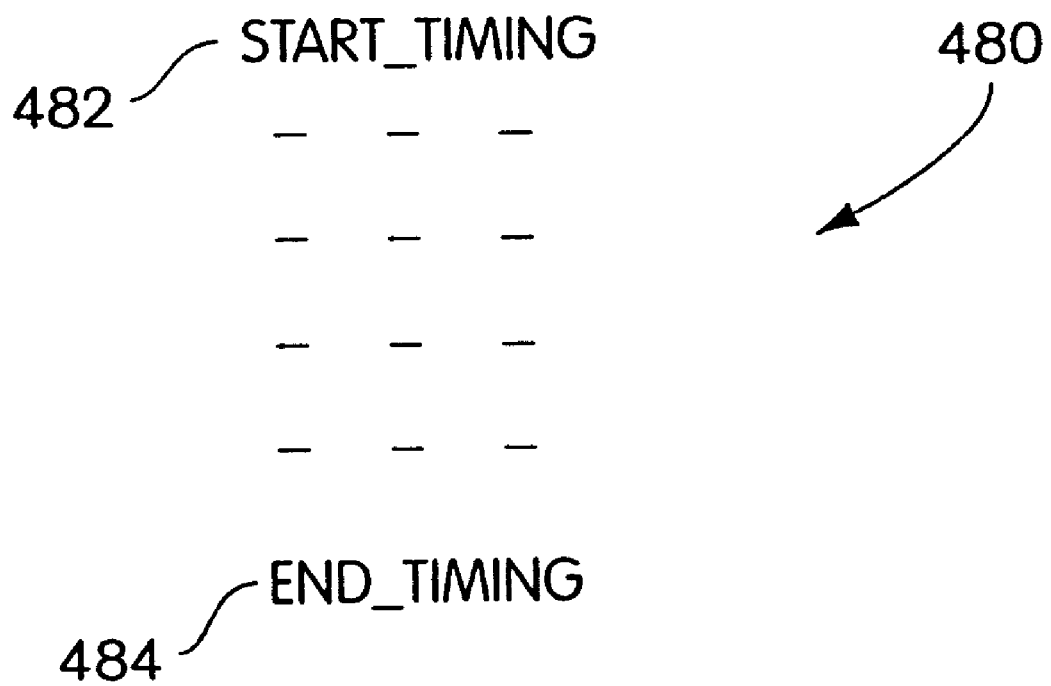
FIG. 16 is a diagram illustrating instrumentation of a section of code to obtain timing information therefor.

Referring to FIG. 16, a block of code 480 includes a start monitoring instruction 482 and an end monitoring instruction 484. The instructions 482, 484 may be added to the block of code 480 in a variety of conventional manners. In a preferred embodiment, the instructions 482, 484 are added using the IR instrumentation mechanism discussed above in connection with FIGS. 1–11(c). In that case, monitoring instructions may be inserted at the beginning and end of functions and for each line of source code. Alternatively, monitoring instructions may be manually inserted into the code or may be inserted automatically using other types of conventional instrumentation programs.

Note that, for a non-multi-tasking operating system, the start monitoring instruction 482 and the end monitoring instruction 484 could each access the system time and then determine that the time of execution between the instructions 482, 484 by calculating the difference between the two system times. However, as discussed above, in a multi-tasking operating system, it is possible for the block of code 480 to be swapped out by the operating system after executing the start timing instruction 482 but before executing the end time instruction 484. Compensating for the time swapped out is discussed below.

In a preferred embodiment of the invention, the start fining instruction 482 first obtains the time value from the system clock. However, a new value is calculated by subtracting the outdelta value for the thread (from the thread database 412) from the system time. Subsequently, the value of the system clock is determined at the end timing instruction 484 and then the value is compensated by the value of outdelta from the thread database 412 at the time the end timing instruction 484 is executed. Note that, if the thread is not swapped out between execution of the start timing instruction 482 and execution of the end timing instruction 484, then the value of outdelta will be the same in both instances so that subtracting the value of outdelta from the system time value when the start timing instruction is executed 482 will not change the difference between the end timing value and the start timing value. However, in instances where the thread is swapped out after the start timing instruction 482 is executed but before the end timing instruction 484 is executed, then the value of outdelta will be greater when the end timing instruction 484 is executed. In that case, the higher value for outdelta at the end timing instruction 484 compensates for the amount of time that the thread containing the start timing instruction 482 and end timing instruction 484 is swapped out. Thus, it is possible to calculate the execution time of code between the end timing instruction 484 and the start timing instruction 482 in a manner that compensates for any time spent being swapped out.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

I claim:

1. A method of determining execution time for a portion of software, comprising:
   (a) obtaining a first time stamp value at a beginning of the portion while obtaining a first deltaout value for a deltaout parameter, said first deltaout value being indicative of an amount of time the portion has been swapped out prior to the first time stamp value;
   (b) obtaining a second time stamp value at an end of the portion while obtaining a second deltaout value for the deltaout parameter, said second deltaout value being indicative of an amount of time the portion has been swapped out prior to the second time stamp value;
   (c) adjusting at least one of the first and second time stamp values using the first and second deltaout values to compensate for any amount of time that the portion was swapped out in a multitasking operating system; and
   (d) subtracting the first time stamp value from the second time stamp value to determine execution time.

2. A method, according to claim 1, further comprising:
   (e) initializing the deltaout parameter to zero prior to the portion being run for the first time;
   (f) incrementing the deltaout parameter by an amount of time the portion is swapped out;
   (g) compensating the first time stamp value by subtracting the first deltaout value therefrom; and
   (h) compensating the second time stamp value by subtracting the second deltaout value therefrom.

3. A method, according to claim 1, further comprising:
   (e) prior to the portion being run for the first time, causing calls to a context swapping operating system routine to also execute a hook routine that determines when the portion is becoming a running portion and when the portion is becoming a non-running portion.

4. A method, according to claim 3, wherein a pointer to the hook routine is provided as a parameter to an operating system routine that causes calls to the context swapping routine to also call the hook routine.

5. A method, according to claim 3, wherein a pointer to the hook routine is written to a location for a pointer for a function that is called by the context swapping routine.

6. A method, according to claim 3, wherein the context swapping routine is patched to cause a jump to the hook routine.

7. A method, according to claim 1, further comprising:
   (e) providing a driver having an entry point that is called each time the portion is swapped in and each time the portion is swapped out.

8. A method, according to claim 7, wherein the driver is a kernel mode driver in a Windows NT operating system environment.

9. A method, according to claim 7, wherein the driver is a virtual driver in a Windows 95 operating system environment.

10. A method, according to claim 7, wherein the portion is part of a thread and wherein the driver is called each time a thread is created and each time a thread is terminated.

11. A method, according to claim 7, further comprising:
    (f) creating data that is accessable by the driver and by the application, the data indicating an amount of time that each thread being monitored is swapped out.

12. A method, according to claim 11, further comprising:
    (g) initializing the deltaout parameter to zero prior to the portion being run for a first time;
    (h) incrementing the deltaout parameter by an amount of time the portion is swapped out;
    (i) compensating the first time stamp value by subtracting the first deltaout value therefrom; and
    (j) compensating the second time stamp value by subtracting the second deltaout value therefrom.

13. A computer program profiler, comprising:
    (a) means for obtaining a first time stamp value at a beginning of a portion of software while obtaining a first deltaout value for a deltaout parameter, said first deltaout value being indicative of an amount of the portion has been swapped out prior to the first time stamp value,
    (b) means for obtaining a second time stamp value at an end of the position while obtaining a second deltaout value, said second deltaout value being indicative of an amount of time the portion has been swapped out prior to the second time stamp value,
    (c) means for adjusting at least one of the first and second time stamp values using the first and second deltaout values to compensate for any amount of time that the portion is swapped out in a multitasking operating system; and
    (d) means for subtracting the first time stamp value from the second time stamp value to determine execution time.

14. A profiler, according to claim 13, further comprising:
    (e) means for initializing the deltaout parameter to zero prior to the portion being run for a first time;
    (f) means for incrementing the deltaout parameter by an amount of time the portion is swapped out;
    (g) means for compensating the first time stamp value by subtracting the first deltaout value therefrom; and
    (h) means for compensating the second time stamp value by subtracting the second deltaout value therefrom.

15. A profiler, according to claim 13, further comprising:
    (e) means for causing calls to a context swapping operating system routine to also execute a hook routine that determines when the portion is becoming a running portion and when the portion is becoming a non-running portion.

16. A profiler, according to claim 15, wherein a pointer to the hook routine is provided as a parameter to an operating system routine that causes calls to the context swapping routine to also call the hook routine.

17. A profiler, according to claim 15, wherein a pointer to the hook routine is written to a location for a pointer for a function that is called by the context swapping routine.

18. A profiler, according to claim 15, wherein the context swapping routine is patched to cause a jump to the hook routine.

19. A profiler, according to claim 13, further comprising:
    (e) means for providing a driver having an entry point that is called each time the portion is swapped in and each time the portion is swapped out.

20. A profiler, according to claim 19, wherein the driver is a kernel mode driver in a Windows NT operating system environment.

21. A profiler, according to claim 19, wherein the driver is a virtual driver in a Windows 95 operating system environment.

22. A profiler, according to claim 19, wherein the portion is a part of a thread and wherein the driver is called by the application each time a thread is created and each time a thread is terminated.

23. A profiler, according to claim 19, further comprising:
(f) means for creating data that is accessable by the driver and the application, the data indicating an amount of time that each thread being monitored is swapped out.

24. A profiler, according to claim 23, further comprising:

(g) means for initializing the deltaout parameter to zero prior to the portion being run for a first time;

(h) means for incrementing the deltaout parameter by an amount of time the portion is swapped out each time the portion is swapped out;

(i) means for compensating the first time stamp value by subtracting the first deltaout value therefrom; and (j) means for compensating the second time stamp value by subtracting the second deltaout value therefrom.

* * * * *